United States Patent
Laughner et al.

(10) Patent No.: US 6,369,176 B1
(45) Date of Patent: Apr. 9, 2002

(54) PROCESS FOR PREPARING IN A SINGLE REACTOR POLYMER BLENDS HAVING A BROAD MOLECULAR WEIGHT DISTRIBUTION

(75) Inventors: Michael K. Laughner; Debra J. Mangold; Deepak R. Parikh, all of Lake Jackson, TX (US)

(73) Assignee: DuPont Dow Elastomers LLC, Wilmington, DE (US)

(*) Notice: Subject to any disclaimer, the term of this patent is extended or adjusted under 35 U.S.C. 154(b) by 0 days.

(21) Appl. No.: 09/638,846

(22) Filed: Aug. 14, 2000

Related U.S. Application Data

(60) Provisional application No. 60/149,853, filed on Aug. 19, 1999.

(51) Int. Cl.⁷ ............. C08F 4/642; C08F 4/643; C08F 4/52
(52) U.S. Cl. ........ 526/114; 526/113; 526/118; 526/119; 526/134; 526/161; 526/339; 526/943; 526/65; 525/240
(58) Field of Search .......... 525/240; 526/113, 526/114, 118, 119, 134, 161, 339, 943

(56) References Cited

U.S. PATENT DOCUMENTS

| | | | |
|---|---|---|---|
| 4,786,697 A | 11/1988 | Cozewith et al. | 526/88 |
| 4,937,299 A | 6/1990 | Ewen et al. | 526/119 |
| 5,055,438 A | 10/1991 | Canich | 502/117 |
| 5,057,475 A | 10/1991 | Canich et al. | 502/104 |
| 5,064,802 A | 11/1991 | Stevens et al. | 502/155 |
| 5,096,867 A | 3/1992 | Canich | 502/103 |
| 5,132,380 A | 7/1992 | Stevens et al. | 526/126 |
| 5,153,157 A | 10/1992 | Hlatky et al. | 502/117 |
| 5,231,106 A | 7/1993 | Knutsen et al. | 514/340 |
| 5,296,433 A | 3/1994 | Siedle et al. | 502/117 |
| 5,296,565 A | 3/1994 | Ueda et al. | 526/114 |
| 5,350,723 A | 9/1994 | Neithammer et al. | 502/104 |
| 5,359,015 A | 10/1994 | Jejelowo | 526/114 |
| 5,371,146 A | 12/1994 | Takahashi et al. | 525/240 |
| 5,372,682 A | 12/1994 | Devore et al. | 204/72 |
| 5,374,696 A | 12/1994 | Rosen et al. | 526/126 |
| 5,420,220 A | 5/1995 | Cheruvu et al. | 526/348.1 |
| 5,442,018 A | 8/1995 | Cann et al. | 526/65 |
| 5,453,410 A | 9/1995 | Kolthammer et al. | 502/155 |
| 5,464,905 A | 11/1995 | Tsutsui et al. | 525/240 |
| 5,470,993 A | 11/1995 | Devore et al. | 556/11 |
| 5,486,632 A | 1/1996 | Devore et al. | 556/11 |
| 5,491,246 A | 2/1996 | Rosen et al. | 556/7 |
| 5,625,087 A | 4/1997 | Devore et al. | 556/468 |
| 5,627,117 A | 5/1997 | Mukaiyama et al. | 502/113 |
| 5,648,438 A | 7/1997 | Henry et al. | 526/65 |
| 5,677,382 A | 10/1997 | Tsuji et al. | 525/237 |
| 5,708,080 A | 1/1998 | Tsutsui et al. | 525/74 |
| 5,721,185 A | 2/1998 | LaPointe et al. | 502/117 |
| 5,834,557 A | 11/1998 | Tsutsui et al. | 525/71 |
| 5,844,045 A | 12/1998 | Kolthammer et al. | 525/240 |
| 5,882,750 A | 3/1999 | Mink et al. | 428/35.7 |

FOREIGN PATENT DOCUMENTS

| | | | |
|---|---|---|---|
| EP | 0 277 003 A1 | 8/1988 | C08F/4/64 |
| EP | 0 416 815 A2 | 3/1991 | C08F/10/00 |
| EP | 0 514 828 A1 | 11/1992 | C07F/7/28 |
| EP | 0 683 184 A1 | 11/1995 | C08F/110/02 |
| EP | 0 733 652 A1 | 9/1996 | C08F/10/00 |
| EP | 0879 849 A2 | 11/1998 | C08L/23/04 |
| EP | 0 926 166 A1 | 6/1999 | C08F/4/69 |
| EP | 0 930 320 A1 | 7/1999 | C08F/210/16 |
| WO | WO93/13143 * | 7/1993 | |
| WO | 93/13143 | 7/1993 | C08F/10/02 |
| WO | 95/00526 | 1/1995 | C07F/17/00 |
| WO | 95/14024 | 5/1995 | C07F/7/28 |
| WO | 97/42237 | 11/1997 | C08F/210/16 |
| WO | 98/27103 | 6/1998 | C07F/17/00 |
| WO | 98/49212 | 11/1998 | C08F/210/18 |
| WO | 98/54232 | 12/1998 | C08F/10/02 |
| WO | 99/31147 | 6/1999 | C08F/4/60 |
| WO | 00/49059 | 8/2000 | C08F/210/00 |

OTHER PUBLICATIONS

Kaminsky, W., et al., Elastomers by Atactic Linkage of $\alpha$-Olefins Using Soluble Ziegler Catalysts, Makromol. Chem., Macromol. Symp., vol. 4, pp. 103–118 (1986).

Lambert, Joseph B., et al., Silyl Cations in the Solid and in Solution, Organometallics, vol. 13, pp. 2430–2443 (1994).

Lambert, Joseph B., et al., Tetrakis(pentafluorophenyl)borate: a New Anion for Silylium Cations in the Condensed Phase, J. Chem. Soc., Chem. Commun., pp. 383–384 (1993).

Williams, T., et al., The Construction of a Polyethylene Calibration Curve for Gel permeation Chromatography Using Polystyrene Fractions, Polymer Letters, vol. 6, pp. 621–624 (1968).

* cited by examiner

*Primary Examiner*—David W. Wu
*Assistant Examiner*—R. Rabago
(74) *Attorney, Agent, or Firm*—Whyte Hirshboeck Dudek SC

(57) ABSTRACT

Ethylene-based polymer blends having an MWD of at least about 2 are made in a single reactor using a mixed constrained geometry catalyst (CGC) system. The process comprises the steps of contacting under polymerization conditions and in a single reaction vessel (i) ethylene, (ii) at least one $C_3$–$C_{20}$ ($\alpha$-olefin, (iii) optionally, at least one polyene, and (iv) a mixed CGC system.

18 Claims, 3 Drawing Sheets

PROCESS FOR PREPARING IN A SINGLE REACTOR POLYMER BLENDS HAVING A BROAD MOLECULAR WEIGHT DISTRIBUTION

This application claims the benefit under 35 USC 119(e) of U.S. provisional application No. 60/149,853, filed Aug. 19, 1999.

FIELD OF THE INVENTION

This invention relates to polymer blends having a molecular weight distribution (MWD) of at least about 2. In one aspect, the invention relates to ethylene/α-olefin and ethylene/α-olefin/diene monomer polymer blends, particularly blends useful as elastomers, while in another aspect, the invention relates to a process of preparing such blends in a single reactor. In yet another aspect, the invention relates to a process of making the polymer blends in a single reactor using a mixed constrained geometry catalyst (CGC) system.

BACKGROUND OF THE INVENTION

Constrained geometry catalysts have found wide acceptance in the manufacture of various olefinic polymers, such as the various ethylene, propylene and diene polymers. These catalysts comprise a metal coordination complex which itself comprises a metal of group 4 of the Periodic Table of the Elements and a delocalized π-bonded moiety substituted with a constrain-inducing moiety, the complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constrain-inducing substituent. The catalyst further comprises a cocatalyst and an activator. "Delocalized π-bonded moiety" means an unsaturated organic moiety, such as those comprising ethylenic or acetylenic functionality, in which the π-electrons are donated to the metal to form a bond.

The metal atom is the active site of each discreet CGC unit and since each such unit has a single metal atom, these catalysts tend to produce in a highly efficient manner high molecular weight (e.g., greater than about 10,000 weight average molecular weight) olefin polymers with a narrow MWD (e.g., about 2 or less) over a wide range of polymerization conditions. CGCs are especially useful for the formation of ethylene homopolymers, copolymers of ethylene and one or more α-olefins (i.e., olefins having three or more carbon atoms with the ethylenic unsaturation between the first and second carbon atoms), and interpolymers of ethylene, propylene and a diene monomer (e.g., EPDM terpolymers).

While a narrow MWD can impart useful properties to ethylene-based polymers for certain applications, e.g., transparency in films, ethylene-based polymers with a broad MWD (e.g., greater than about 2) usually process more efficiently and have better physical properties, e.g., temperature performance, for such applications as injection molded or extruded articles, e.g., gaskets and wire and cable coatings, than do ethylene-based polymers with a narrow MWD. Various processes are known for producing broad MWD ethylene-based polymers or polymer blends with a CGC, but all are subject to improvement.

For example, one process for producing such polymers or polymer blends requires the use of multiple reactors deployed in parallel with each reactor containing the same CGC but operated under different polymerization conditions. The product outputs of the reactors are then blended with one another. This produces a polymer blend with a substantially uniform molecular architecture, which is often a desirable property, particularly for elastomers (i.e., polymers with a crystallinity of less than about 45%). For polymer blends of similar crystallinity, those blends of substantially uniform molecular architecture generally exhibit superior physical performance properties, e.g., tensile, modulus, tear, etc., than those blends of a relatively nonuniform molecular architecture. "Substantially uniform molecular architecture" means that each polymer molecule of the blend has substantially the same comonomer content and distribution although the polymer molecules from one reactor differ in weight average molecular weight (Mw) from the polymer molecules produced in the other reactor(s).

One difficulty with this process is that it requires balancing the operation and output of one reactor with the other reactor(s). Another difficulty is that it requires a separate, post-reaction blending step. Yet another difficulty is that with the use of multiple reactors, the ratio of high molecular weight (Mw) to low Mw components in the polymer blend is limited to the capacity of each reactor.

In another process, multiple reactors are deployed in series with each reactor operated at substantially the same polymerization conditions but with each reactor containing a different CGC. The output of the first reactor becomes, of course, a feed for the second reactor, and the product output of the second reactor is a polymer blend. While this process avoids the need for a post-reaction blending step, it still requires balancing the operation of one reactor with the other reactor(s) in the series, and the output of the process is limited by the capacity of the reactors. Moreover, this process often produces a blend in which the molecular architecture is not uniform.

Variations on both of these multiple reactor processes are known, e.g., operating the multiple reactors deployed in series at dissimilar conditions, using a catalyst other than or in addition to a CGC, etc., and U.S. Pat. No. 5,844,045 to Kolthammer and Cardwell, which is incorporated herein by reference, provides a representative description of a multiple reactor process. However, producing a polymer blend in a single reactor, i.e., a reactor blend, saves all the costs associated with running multiple reactors. Moreover, the ratio of high molecular weight (Mw) to low Mw components in the polymer blend can be controlled by controlling the weight ratio of one catalyst to another, and thus the capacity of the individual reactors is not a constraining consideration with respect to this property.

For example, U.S. Pat. No. 4,937,299 to Ewen and Welborn teaches a process for producing (co)polyolefin reactor blends comprising polyethylene and copolyethylene-α-olefins. These blends are prepared in a single reactor by simultaneously polymerizing ethylene and copolymerizing ethylene and an α-olefin in the presence of at least two different metallocenes and an alumoxane. However, Ewen and Welborn do not teach (i) the use of mixed CGC catalyst systems, or (ii) producing an ethylene-based polymer blend having an MWD (a) of at least about 2, and (b) at least ten percent greater than either ethylene-based polymer component of the blend prepared in a single reactor with any single component of the mixed catalyst system under similar polymerization conditions. Ewen and Welborn also do not teach the production of an ethylene-based polymer blend in which each polymer component of the blend has a uniform molecular architecture (at least with respect to the polymer units derived from ethylene and the α-olefin).

U.S. Pat. No. 5,359,015 to Jejelowo teaches a process of producing polyolefins having a controllable broaden MWD utilizing transition metal metallocene catalyst systems comprising a first component comprising at least one transition metal metallocene having at least one cyclopentadienyl ring that is substituted with a first substituent having a secondary or tertiary carbon atom through which it is covalently bonded to the at least on cyclopentadienyl ring in the system, a second component comprising at least one transition metal metallocene having at least one cyclopentadienyl ring that is substituted with a second substituent that is hydrogen or optionally a second hydrocarbon substituent different from the first substituent, and an activator selected from ionic activators or alumoxane or a combination of the two. The MWD of the polymer produced by the catalyst system is generally somewhere between the high and low MWD that such catalyst system components would produce if utilized alone.

U.S. Pat. No. 5,627,117 to Mukaiyama and Oouchi teaches a process for producing a polyolefin with a wide MWD, the process employing an olefin polymerization catalyst comprising a transition metal compound having at least two transition metals in which at least one of the metals is bonded to a ligand having a cyclopentadienyl skeleton at least one of the metals is Sc, Y, Ti, Zr, Hf, V, Nb, Ta, Cr, Mo, W and lanthanoid metals and the other is a selected transition metal.

WO 93/13143 to Parikh, Cardwell and Kolthammer teaches a process of producing an interpolymer product comprising a first homogeneous ethylene/(α-olefin interpolymer and at least one-second ethylene/α-olefin interpolymer. The process comprises the step of using at least two CGCs having different reactivities such that the first ethylene/α-olefin interpolymer has a narrow MWD with a very high comonomer content and a high molecular weight and the second ethylene/α-olefin interpolymer also has a narrow MWD but a low comonomer content and a molecular weight lower than that of the first interpolymer. The first and second ethylene/α-olefin interpolymers can be polymerized in a single reactor.

WO 99/31147 to Nemzek, Karol and Kao teaches a gas phase ethylene polymerization process which uses a mixed catalyst system comprising at least one supported and at least one unsupported metallocene catalyst. The metallocene catalysts include CGCs, the polymerization process can be conducted in a single reaction vessel, and the process produces a polymer blend. However, none of the polymer blends reported in the examples have an MWD greater than any of the polymer components of the blend, and the molecular architecture of the blend polymer components is unreported.

None of these references, the U.S. patents of which are incorporated herein by reference, however, teach the use of a mixed CGC system to produce a reactor blend (i) having an MWD (a) of at least about 2, and (b) at least ten percent greater than either ethylene-based polymer component of the blend prepared in a single reactor with any single component of the mixed catalyst system under similar polymerization conditions, and (ii) in which each polymer component of the blend has a uniform molecular architecture (at least with respect to the polymer units derived from ethylene and the α-olefin).

SUMMARY OF THE INVENTION

According to one embodiment of this invention, an ethylene-based polymer blend (i) having an MWD (a) of at least about 2, and (b) at least ten percent greater than any ethylene-based polymer component of the blend prepared in a single reactor with any single component of the mixed catalyst system under similar polymerization conditions, and (ii) in which each polymer component of the blend has a uniform molecular architecture (at least with respect to the polymer units derived from ethylene and the α-olefin) is prepared by contacting under polymerization conditions and in a single reaction vessel:

A. ethylene,
B. at least one $C_3$–$C_{20}$ α-olefin, and
C. a mixed CGC system comprising a first catalyst and a second catalyst, each catalyst having substantially the same reactivity ratio and each catalyst comprising:
1. A metal complex of formula I $$ZLMX_pX'_q \tag{I}$$

wherein
M is a metal of Group 4 of the Periodic Table of the Elements having an oxidation state of +2, +3 or +4 bound in an $\pi^5$ bonding mode to L;
L is a cyclopentadienyl-, indenyl-, tetrahydroindenyl-, fluorenyl-, tetrahydrofluorenyl-, or octahydrofluorenyl-group covalently substituted with at least the divalent moiety, Z, and L further may be substituted with from 1 to 8 substituents independently selected from the group consisting of hydrocarbyl, halo, halohydrocarbyl, hydrocarbyloxy, dihydrocarbylamine, dihydrocarbylphosphino or silyl groups containing up to 20 nonhydrogen atoms;
Z is a divalent moiety, or a moiety comprising one σ-bond and a neutral two electron pair able to form a coordinate-covalent bond to M, Z comprising boron, or a member of Group 14 of the Periodic Table of the Elements, and also comprising nitrogen, phosphorus, sulfur or oxygen;
X is an anionic ligand group having up to 60 atoms exclusive of the class of ligands that are cyclic, delocalized, π-bound ligand groups;
X' independently each occurrence is a neutral ligating compound having up to 20 atoms;
p is 0, 1 or 2, and is two less than the formal oxidation state of M, with the proviso that when X is a dianionic ligand group, p is 1; and
q is 0, 1 or 2; and
2. An activating cocatalyst;

with the provisos that (i) the first catalyst is different from the second catalyst, (ii) the first catalyst has a reactivity ratio that is substantially the same as the reactivity ratio of the second catalyst with respect to ethylene and the at least one $C_3$–$C_{20}$ α-olefin, and (iii) the weight ratio of the first catalyst to the second catalyst, based on the weight of the metal M in each catalyst, is between about 90:10 and 10:90.

In another embodiment of the invention, an ethylene-based polymer blend having an MWD (a) of at least about 2, and (b) at least ten percent greater than any ethylene-based polymer component of the blend prepared in a single reactor with any single component of the mixed catalyst system under similar polymerization conditions is prepared by contacting under polymerization conditions and in a single reaction vessel:

A. ethylene,
B. at least one $C_3$–$C_{20}$ α-olefin,
C. at least one polyene, and D. a mixed CGC system comprising a first catalyst and a second catalyst, each catalyst having substantially the same reactivity ratio and each catalyst comprising:
  1. A metal complex of formula I,

$$ZLMX_pX'_q \qquad (I)$$

and
  2. an activating cocatalyst;
with the provisos that (i) the first catalyst is different from the second catalyst, and (ii) the weight ratio of the first catalyst to the second catalyst, based on the weight of the metal M in each catalyst, is between about 90:10 and 10:90. The definition of Z, L, M, X, X', p and q are as defined above.

In both embodiments, the polymer blend may be recovered from the reaction vessel in any convenient manner.

Each CGC of the system produces an ethylene/α-olefin polymer that has substantially the same molecular architecture as the ethylene/x-olefin polymer produced by the other CGC of the system, but each polymer has a different molecular weight. The reaction temperature controls the molecular weights of the copolymers. With respect to ethylene/α-olefin/polyene polymer blends, the molecular architecture of a polymer produced by one CGC of the system may differ from the molecular architecture of a polymer produced by the other CGC of the system because the reactivity ratio of the polyene may be different with each CGC of the system (although the size and distribution of the ethylene runs in each polymer molecule may be substantially similar).

The polymer blend also has a rheology ratio greater than any ethylene-based polymer component of the blend prepared in a single reactor with any single component of the mixed catalyst system under similar polymerization conditions.

By "mixed catalyst system" is meant that each CGC of the system is different from the other CGC. The CGCs can differ in one or more of their respective constituent parts, i.e., the metal and/or organic ligand component of the metal complex, the cocatalyst and the activator. The mixed catalyst system can comprise two or more CGCs, but dual systems (i.e., systems containing essentially only two CGCs) are preferred.

DETAILED DESCRIPTION OF THE INVENTION

Figure 1:
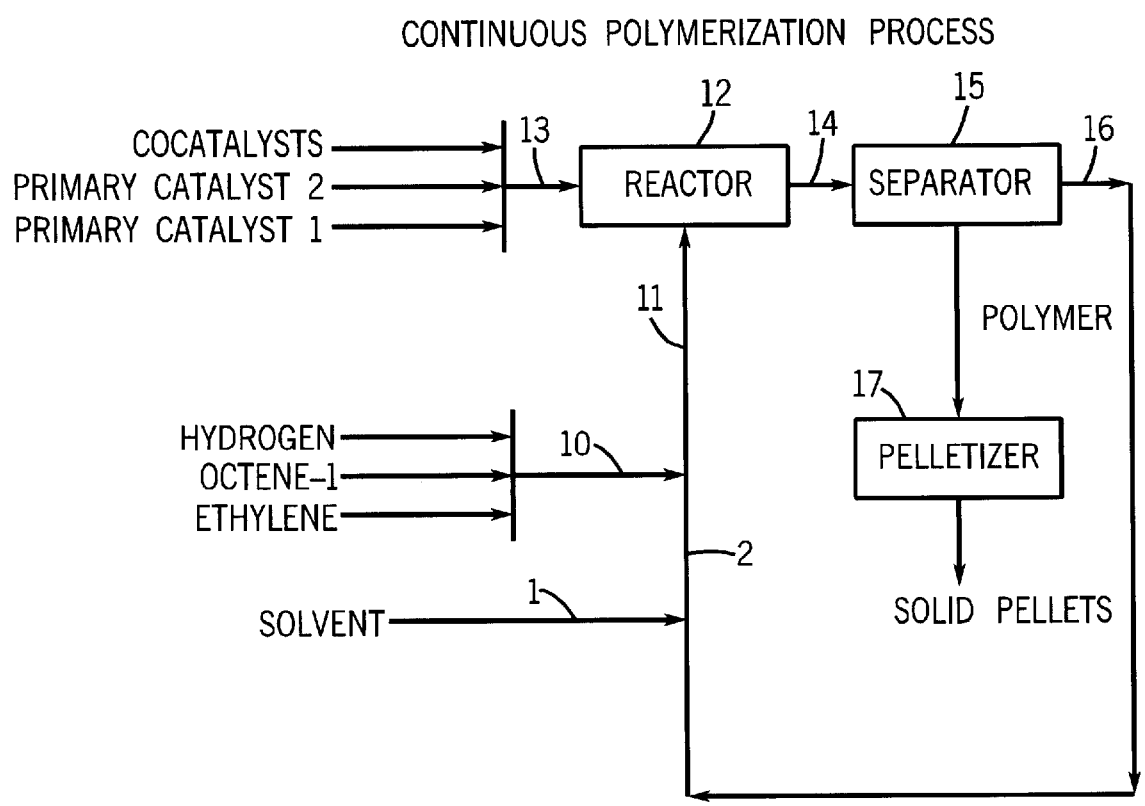
FIG. 1 is a flow diagram illustrating a continuous polymerization process for the production of a polymer blend in a single reaction vessel using a mixed catalyst system.

The blend components of this invention are either homopolymers of ethylene ($CH_2$=$CH_2$) or polymers, i.e., interpolymers, of ethylene with at least one $C_3$–$C_{20}$ α-olefin (preferably an aliphatic α-olefin) comonomer, and/or a polyene comonomer, e.g., a conjugated diene, a nonconjugated diene, a triene, etc. The term interpolymer includes copolymers, e.g. ethylene/propylene (EP), and terpolymers, e.g. EPDM, but it is not limited to polymers made with only ethylene and one or two monomers. Examples of the $C_3$–$C_{20}$ α-olefins include propene, 1-butene, 4-methyl-1-pentene, 1-hexene, 1-octene, 1-decene, 1-dodecene, 1-tetradecene, 1-hexadecene, 1-octadecene and 1-eicosene. The α-olefin can also contain a cyclic structure such as cyclohexane or cyclopentane, resulting in an α-olefin such as 3-cyclohexyl-1-propene (allyl-cyclohexane) and vinyl-cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (e.g., α-methylstyrene, etc.) are α-olefins for purposes of this invention.

Polyenes are unsaturated aliphatic or alicyclic compounds containing more than four carbon atoms in a molecular chain and having at least two double and/or triple bonds, e.g., conjugated and nonconjugated dienes and trienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene, 5-vinyl-2-norbornene and 7-methyl-1,6-octadiene preferred nonconjugated dienes.

Examples of conjugated dienes include butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1,3, 4-methylpentadiene-1,3, 1,3-pentadiene ($CH_3$CH=CH—CH=$CH_2$; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Examples of trienes include 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

Polymer blends comprising copolymers of ethylene and one aliphatic $C_3$–$C_{20}$ α-olefin or one polyene (either conjugated or nonconjugated) can be prepared using the process of this invention. Polymer blends comprising interpolymers of ethylene, at least one aliphatic $C_3$–$C_{20}$ α-olefin, and/or at least one polyene (either conjugated or nonconjugated) can also be made by using this process. Exemplary copolymers include ethylene/propylene, ethylene/butene, ethylene/1-octene, ethylene/5-ethylidene-2-norbornene, ethylene/5-vinyl-2-norbornene, ethylene/1,7-octadiene, ethylene/7-methyl-1,6-octadiene and ethylene/1,3,5-hexatriene.

Exemplary terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene and ethylene/propylene/1,3,5-hexatriene. Exemplary tetrapolymers include ethylene/propylene/1-octene/diene (e.g. ENB), ethylene/butene/1-octene/diene and ethylene/propylene/mixed dienes, e.g. ethylene/propylene/5-ethylidene-2-norbornene/piperylene. In addition, the blend components made using the process of this invention can include minor amounts, e.g. 0.05–0.5 percent by weight, of long chain branch enhancers, such as 2,5-norbornadiene (aka bicyclo[2,2,1]hepta-2,5-diene), diallylbenzene, 1,7-octadiene ($H_2C=CH(CH_2)_4CH=CH_2$), and 1,9-decadiene ($H_2C=CH(CH_2)_6CH=CH_2$).

Typically, the blend components made by the process of this invention comprise at least about 20, preferably at least about 30 and more preferably at least about 40, weight percent ethylene; at least about 5, preferably at least about 15 and more preferably at least about 25, weight percent of at least one α-olefin; and, if a polyene-containing terpolymer, greater than 0, preferably at least about 0.1 and more preferably at least about 0.5, weight percent of at least one conjugated or nonconjugated polyene. As a general maximum, the blend components made by the process of this invention comprise not more than about 95, preferably not more than about 85 and more preferably not more than about 75, weight percent ethylene; not more than about 80, preferably not more than about 70 and more preferably not more than about 60, weight percent of at least one α-olefin; and, if a terpolymer, not more than about 20, preferably not more than about 15 and more preferably not more than about 12, weight percent of at least one of a conjugated or nonconjugated diene. All weight percentages are based on weight of the blend.

The polydispersity (molecular weight distribution or Mw/Mn or MWD) of the polymer blend generally ranges from at least about 2, preferably at least about 2.1, and especially at least about 2.2 to about 10, preferably about 6, and especially about 4. One hallmark of this invention is that the MWD of the polymer blend is at least 10, preferably at least 15 and more preferably at least about 20, percent greater than a polymer blend component prepared in a single reaction vessel with either the first or second catalyst alone under similar polymerization conditions.

The polydispersity index is typically measured by gel permeation chromatography (GPC) on a Waters 150 C. high temperature chromatographic unit equipped with three linear mixed bed columns (Polymer Laboratories (10 micron particle size)) operating at a system temperature of 140 C. The solvent is 1,2,4-trichlorobenzene from which about 0.5% by weight solutions of the samples are prepared for injection. The flow rate is 1.0 milliliter/minute, and the injection size is 100 microliters.

The molecular weight determination is deduced by using narrow molecular weight distribution polystyrene standards (from Polymer Laboratories) in conjunction with their elusion volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the equation:

$$M_{polyethylene} = (a)(M_{polystyrene})^b$$

In this equation, a=0.4316 and b=1.0. Weight average molecular weight, Mw, is calculated in the usual manner according to the formula:

$$Mw = \Sigma(w_i)(M_i)$$

where $w_i$ and $M_i$ are the weight fraction and molecular weight respectively of the $i^{th}$ fraction eluting from the GPC column. Generally, the Mw of the polymer blend ranges from about 10,000, preferably about 20,000, more preferably about 40,000, and especially about 60,000, to about 1,000,000, preferably about 800,000, more preferably about 600,000, and especially about 500,000.

The polymer blends made by the process of this invention cover a range of viscosities, depending upon the molecular weight of the blend and optional post-polymerization rheological modification. In general, the blend viscosity is characterized by a Mooney viscosity which is measured according to ASTM D 1646-89 using a shear rheometer at 125 C. The polymer blend Mooney viscosity generally ranges from a minimum of less than 0.01, preferably 0.1, more preferably about 1, and especially about 15 to a maximum of about 150, preferably about 125, more preferably about 100, and especially about 80.

The rheological or shear thinning behavior of the ethylene interpolymer is determined by measuring the ratio of interpolymer viscosity at 0.1 rad/sec to viscosity at 100 rad/sec. This ratio is known as the Rheology Ratio (RR), V0.1/V100, or more simply, 0.1/100. The RR is an extension of $I_{10}/I_2$ and as such, in those instances in which the measurement of $I_2$ and $I_{10}$ are difficult, e.g., the $I_2$ is less than 0.5, or the molecular weight of the interpolymer is relatively high, or the Mooney viscosity of the interpolymer is greater than about 35, the RR of the interpolymer can be measured using a parallel plate rheometer. One hallmark of this invention is that the rheology ratio of the polymer blend is typically greater than that of a polymer blend component of substantially the same Mooney viscosity and prepared in a single reaction vessel with either the first or second catalyst alone under similar polymerization conditions.

The density of the polymer blends is measured according to ASTM D-792, and this density ranges from a minimum of about 0.850 grams/cubic centimeter (g/cm$^3$), preferably about 0.853 g/cm$^3$, and especially about 0.855 g/cm$^3$, to a maximum of about 0.970 g/cm$^3$, preferably about 0.940 g/cm$^3$, and especially about 0.930 g/cm$^3$. For those polymer blends that are elastomers, i.e., with a crystallinity less than about 45%, the maximum density is about 0.895, preferably about 0.885 and more preferably 0.875, g/cm$^3$.

For polymer blends intended for use as elastomers, the crystallinity is preferably less than about 40, more preferably less than about 30, percent, preferably in combination with a melting point of less than about 115, preferably less than about 105, C, respectively. Elastomeric polymer blends with a crystallinity of 0 to 25 percent are even more preferred. The percent crystallinity is determined by dividing the heat of fusion as determined by differential scanning calorimetry (DSC) a of polymer blend sample by the total heat of fusion for that polymer blend sample. The total heat of fusion for high-density homopolymer polyethylene (100% crystalline) is 292 joule/gram (J/g).

Mixed Catalyst System

The constrained geometry metal complexes of the mixed catalyst system, and methods for their preparation, are disclosed in U.S. Ser. No. 07/545,403 filed Jul. 3, 1990 (EP-A-416,815); EP-A-514,828; U.S. Pat. Nos. 5,721,185 and 5,374,696; as well as U.S. Pat. Nos. 5,470,993, 5,374, 696, 5,231,106, 5,055,438, 5,057,475, 5,096,867, 5,064,802, 5,132,380, 5,321,106, 5,470,993, 5,486,632, WO 95/00526, WO 98/49212 and U.S. S. No. 60/005913. In EP-A-514,828 certain borane derivatives of the foregoing catalysts are disclosed and a method for their preparation taught and claimed. In U.S. Pat. No. 5,453,410 combinations of cationic catalyst complexes with an alumoxane are disclosed as suitable olefin polymerization catalysts. Variously substituted indenyl containing metal complexes are taught in U.S. Ser. No. 08/592,756 filed Jan. 26, 1996, now abandoned, as well as in WO 95/14024. The teachings of all of the above patents and allowed U.S. patent applications are incorporated herein by reference.

The CGCs used in the practice of this invention comprise:
A. 1) a metal complex of formula (I), and
2) an activating cocatalyst,
the metal complex and the activating cocatalyst present in a molar ratio of 1:10,000 to 100:1, or
B. the reaction product formed by converting a metal complex of formula (I) to an active catalyst by use of an activating technique.

Formula (I) is:

$$ZLMX_pX'_q \qquad (I)$$

wherein
M is a metal of Group 4 of the Periodic Table of the Elements having an oxidation state of +2, +3 or +4 bound in an $\eta^5$ bonding mode to L;

L is a cyclopentadienyl-, indenyl-, tetrahydroindenyl-, fluorenyl-, tetrahydrofluorenyl-, or octahydrofluorenyl- group covalently substituted with at least the divalent moiety, Z, and L further may be substituted with from 1 to 8 substituents independently selected from the group consisting of hydrocarbyl, halo, halohydrocarbyl, hydrocarbyloxy, dihydrocarbylamine, dihydrocarbylphosphino or silyl groups containing up to 20 nonhydrogen atoms;

Z is a divalent moiety, or a moiety comprising one σ-bond and a neutral two electron pair able to form a coordinate-covalent bond to M, Z comprising boron, or a member of Group 14 of the Periodic Table of the Elements, and also comprising nitrogen, phosphorus, sulfur or oxygen;

X is an anionic ligand group having up to 60 atoms exclusive of the class of ligands that are cyclic, delocalized, π-bound ligand groups;

X' independently each occurrence is a neutral ligating compound having up to 20 atoms;

p is 0, 1 or 2, and is two less than the formal oxidation state of M, with the proviso that when X is a dianionic ligand group, p is 1; and q is 0, 1 or 2.

The metal complex of formula I is rendered catalytically active by combination with an activating cocatalyst or use of an activating technique.

In one embodiment, the metal complex is of formula II $$(ZLM^*X^*_{p'})^*A^- \qquad (II)$$

wherein:

M* is a metal of Group 4 of the Periodic Table of the Elements having an oxidation state of +3 or +4, bound in an $\eta^5$ bonding mode to L;

L is a cyclopentadienyl-, indenyl-, tetrahydroindenyl-, fluorenyl-, tetrahydrofluorenyl-, or octahydrofluorenyl- group covalently substituted with at least the divalent moiety, Z and L further may be substituted with from 1 to 4 substituents independently selected from the group consisting of hydrocarbyl, halo, halohydrocarbyl, hydrocarbyloxy, dihydrocarbylamino, dihydrocarbylphosphino or silyl groups containing up to 20 nonhydrogen atoms;

Z is a divalent moiety bound to both L and M* via σ-bonds, Z comprising boron, or a member of Group 14 of the Periodic Table of the Elements, and also optionally comprising nitrogen, phosphorus, sulfur or oxygen;

X* is an anionic ligand group having up to 60 atoms exclusive of the class of ligands that are cyclic, delocalized, π-bound ligand groups;

p* is 0 or 1, and is three less than the formal oxidation state of M; and

A⁻ is an inert, noncoordinating anion.

All reference to the Periodic Table of the Elements shall refer to the Periodic Table of the Elements published and copyrighted by CRC Press, Inc., 1995. Also, any reference to a Group or Groups shall be to the Group or Groups as reflected in this Periodic Table of the Elements using the IUPAC system for numbering groups.

Zwitterionic complexes result from activation of a Group 4 metal diene complex, that is, complexes in the form of a metallocyclopentene wherein the metal is in the +4 formal oxidation state, by the use of a Lewis acid activating cocatalyst, especially tris(perfluoroaryl)borane compounds. These zwitterionic complexes are believed to correspond to formula (III):

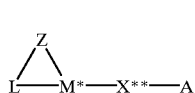

(III)

M is a Group 4 metal in the +4 formal oxidation state;
L and Z are as previously defined;
X** is the divalent remnant of the conjugated diene formed by ring opening at one of the carbon to metal bonds of a metallocyclopentene; and
A is the moiety derived from the activating cocatalyst.

As used herein, "noncoordinating, compatible anion" means an anion which either does not coordinate to component A) or which is only weakly coordinated with A) and remains sufficiently labile to be displaced by a neutral Lewis base. A noncoordinating, compatible anion specifically refers to a compatible anion which when functioning as a charge balancing anion in one of the CGCs of dual CGC system, does not transfer an anionic substituent or fragment of the substituent to the cation to form a neutral four coordinate complex and a neutral metal byproduct. "Compatible anions" are anions which are not degraded to neutrality when the initially formed complex decomposes and are noninterfering with desired subsequent polymerizations.

Preferred X' groups are phosphines, especially trimethylphosphine, triethylphosphine, triphenylphosphine and bis(1,2-dimethylphosphino)ethane; P(OR$^{iv}$)$_3$, wherein R$^{iv}$ is a hydrocarbyl group preferably containing 1 to 20 carbon atoms; ethers, especially tetrahydrofuran; amines, especially pyridine, bipyridine, tetramethylethylenediamine (TMEDA), and triethylamine; olefins, and conjugated dienes having from 4 to 40 carbon atoms. Complexes including the latter X' groups include those in which the metal is in the +2 formal oxidation state.

In one preferred embodiment, A) metal complexes used according to the present invention are complexes corresponding to formula (IV):

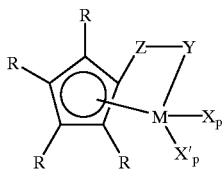

(IV)

in which:

R independently each occurrence is a group selected from hydrogen, hydrocarbyl, halohydrocarbyl, silyl, germyl and mixtures thereof, said group containing up to 20 nonhydrogen atoms;

M is titanium, zirconium or hafnium;

Z is a divalent moiety comprising boron, or a member of Group 14 of the Periodic Table of the Elements, and also comprising nitrogen, phosphorus, sulfur or oxygen, said moiety having up to 60 nonhydrogen atoms;

X and X' are as previously defined;

p is 0, 1 or 2; and q is 0 or 1;

with the proviso that;

when p is 2, q is 0, M is in the +4 formal oxidation state, and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)phoshino-substituted derivatives thereof, said X group having up to 20 nonhydrogen atoms, when p is 1, q is 0, M is in the +3 formal oxidation state, and X is a stabilizing anionic ligand group selected from the group consisting of allyl, 2-(N,N-dimethylaminomethyl)phenyl, and 2-(N,N-dimethyl) aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or nonconjugated diene, optionally substituted with one or more hydrocarbyl groups, said X' having up to 40 carbon atoms and forming a π-complex with M.

More preferred A) coordination complexes of this embodiment are complexes corresponding to formula (V):

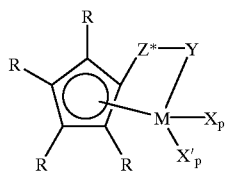

(V)

wherein

R independently each occurrence is hydrogen or $C_{1-6}$ alkyl;

M is titanium;

Y is —O—, —S—, —NR*—, —PR*—;

Z* is $SiR*_2$, $CR*_2$, $SiR*_2SiR*_2$, $CR*_2CR*_2$, $CR*=CR*$, $CR*_2SiR*_2$, or $GeR*_2$;

R* each occurrence is independently hydrogen, or a member selected from hydrocarbyl, hydrocarbyloxy, silyl, halogenated alkyl, halogenated aryl, and combinations thereof, and R* having up to 20 nonhydrogen atoms, and optionally, two R* groups from Z (when R* is not hydrogen), or an R* group from Z and an R* group from Y form a ring system;

p is 0, 1 or 2;

q is 0 or 1;

with the proviso that:

when p is 2, q is 0, M is in the +4 formal oxidation state, and X is independently each occurrence methyl or benzyl, when p is 1, q is 0, M is in the +3 formal oxidation state, and X is 2 (N,N-dimethyl)aminobenzyl; or M is in the +4 formal oxidation state and X is 1,4butadienyl, and when p is 0, q is 1, M is in the +2 formal oxidation state, and X' is 1,4-diphenyl-1,3-butadiene or 1,3-pentadiene. The latter diene is illustrative of unsymmetrical diene groups that result in production of metal complexes that are actually mixtures of the respective geometrical isomers.

In another preferred embodiment, the A) metal complexes used according to the present invention are complexes corresponding to formula (VI):

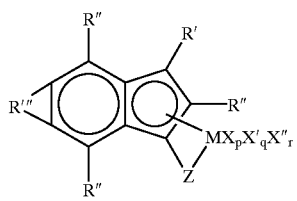

(VI)

where M is titanium, zirconium or hafnium in the +2, +3 or +4 formal oxidation state;

R' and R" are independently each occurrence hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylene-phosphino-substituted hydrocarbyl, or hydrocarbylsulfido-substituted hydrocarbyl, said R' or R" group having up to 40 nonhydrogen atoms, and optionally two or more of the foregoing groups may together form a divalent derivative;

R'" is a divalent hydrocarbylene- or substituted hydrocarbylene group forming a fused system with the remainder of the metal complex, said R'" containing from 1 to 30 nonhydrogen atoms;

Z is a divalent moiety, or a moiety comprising one σ-bond and a neutral two electron pair able to form a coordinate-covalent bond to M, said Z comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups;

X' independently each occurrence is a neutral ligating compound having up to 20 atoms;

X" is a divalent anionic ligand group having up to 60 atoms;

p is 0, 1, 2, or 3;

q is 0, 1 or 2, and r is 0 or 1.

The number of X groups depends on the oxidation state of M, whether Z is divalent or not and whether any neutral diene groups or divalent X" groups are present. The skilled artisan will appreciate that the quantity of the various substituents and the identity of Z are chosen to provide charge balance, thereby resulting in a neutral metal complex. For example, when Z is divalent, and r is 0, p is two less than the formal oxidation state of M. When Z contains one neutral two electron coordinate-covalent bonding site, and M is in a formal oxidation state of +3, p may equal 0 and r equal 1, or p may equal 2 and r equal 0. In a final example, if M is in a formal oxidation state of +2, Z may be a divalent ligand group, p and r may both equal 0 and one neutral ligand group may be present.

The above complexes may exist as isolated crystals optionally in pure form or as a mixture with other complexes, in the form of a solvated adduct, optionally in a solvent, especially an organic liquid, as well as in the form of a dimer or chelated derivative thereof, wherein the chelating agent is an organic material such as ethylenediaminetetraacetic acid (EDTA).

Preferred coordination complexes for use as part of the second component of the dual CGC catalyst system are complexes corresponding to formula (VII) or (VIII):

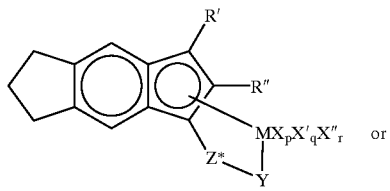

(VII)

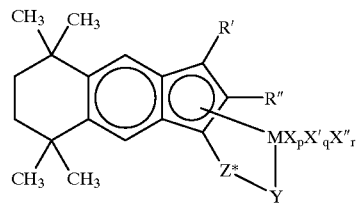

(VIII)

wherein:

R' is hydrocarbyl, di(hydrocarbylamino), or a hydrocarbyleneamino group, said R' having up to 20 carbon atoms, R" is $C_{1-20}$ hydrocarbyl or hydrogen;

M is titanium;

Y is —O—, —S—, —NR*—, —PR*—; —NR$_2$*, or —PR$_2$*;

Z* is SiR*$_2$, CR*$_2$, SiR*$_2$SiR*$_2$, CR*$_2$CR*$_2$, CR*=CR*, CR*$_2$SiR*$_2$, or GeR*$_2$;

R* each occurrence is independently hydrogen, or a member selected from hydrocarbyl, hydrocarbyloxy, silyl, halogenated alkyl, halogenated aryl, and combinations thereof, said R* having up to 20 non-hydrogen atoms, and optionally, two R* groups from Z (when R* is not hydrogen), or an R* group from Z and an R* group from Y form a ring system;

X, X' and X" are as previously defined;

p is 0, 1 or 2;

q is 0 or 1; and r is 0 or 1;

with the proviso that:

when p is 2, q and r are 0, M is in the +4 formal oxidation state (or M is in the +3 formal oxidation state if Y is —NR*$_2$ or —PR*$_2$), and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, as well as halo-, dihydrocarbyl)amino-, hydrocarbyloxy-, and di(hydrocarbyl)phosphino-substituted derivatives thereof, said X group having up to 30 nonhydrogen atoms, when r is 1, p and q are 0, M is in the +4 formal oxidation state, and X" is a dianionic ligand selected from the group consisting of hydrocarbadiyl, oxyhydrocarbyl, and hydrocarbylenedioxy groups, said X group having up to 30 nonhydrogen atoms, when p is 1, q and r are 0, M is in the +3 formal oxidation state, and X is a stabilizing anionic ligand group selected from the group consisting of allyl, 2-(N,N-dimethylamino)phenyl, 2-(N,N-dimethylaminomethyl)phenyl, and 2-(N,N-dimethylamino)benzyl, and when p and r are 0, q is 1, M is in the +2 formal oxidation state, and X' is a neutral, conjugated or nonconjugated diene, optionally substituted with one or more hydrocarbyl groups, said X' having up to 40 carbon atoms and forming a π-complex with M. Most preferred metal complexes are those according to the previous formula (XIV) or (XV), wherein M, X, X', X", R'R", Z*, Y, p, q and r are as previously defined, with the proviso that:

when p is 2, q and r are 0, M is in the +4 formal oxidation state, and X is independently each occurrence methyl, benzyl, or halide;

when p and q are 0, r is one, and M is in the +4 formal oxidation state, X" is a 1,4-butadienyl group that forms a metallocyclopentene ring with M, when p is 1, q and r are 0, M is in the +3 formal oxidation state, and X is 2-(N,N-dimethylamino)benzyl; and when p and r are 0, q is 1, M is in the +2 formal oxidation state, and X' is 1,4-diphenyl-1,3-butadiene or 1,3-pentadiene.

Especially preferred coordination complexes corresponding to the previous formulas (XIV) and (XV) are uniquely substituted depending on the particular end use thereof. In particular, highly useful metal complexes for use in catalyst compositions for the copolymerization of ethylene, one or more monovinyl aromatic monomers, and optionally an α-olefin or diolefin comprise the foregoing complexes (XIV) or (XV) wherein R' is $C_{6-20}$ aryl, especially phenyl, biphenyl or naphthyl, and R" is hydrogen or methyl, especially hydrogen. More preferably such complexes are 3-phenyl-substituted s-indecenyl complexes corresponding to formulae (IX) or (X):

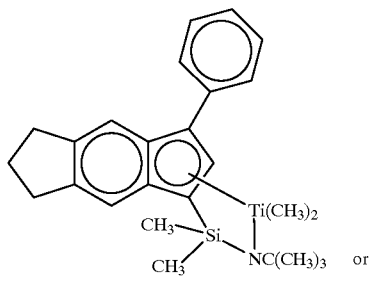

(IX)

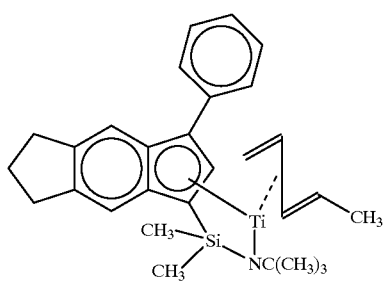

(X)

Highly useful metal complexes for use in the second component of the dual CGC catalyst system comprise the foregoing complexes (XIV) or (XV) wherein R' is $C_{1-4}$ alkyl, N,N-dimethylamino or 1-pyrrolidinyl, and R" is hydrogen or $C_{1-4}$ alkyl. Moreover, in such complexes, Y is preferably a cyclohexylamido group, X is methyl, p is two, and both q and r are 0. Most preferably such complexes are 2,3-dimethyl-substituted s-indecenyl complexes corresponding to formula (XI) or (XII):

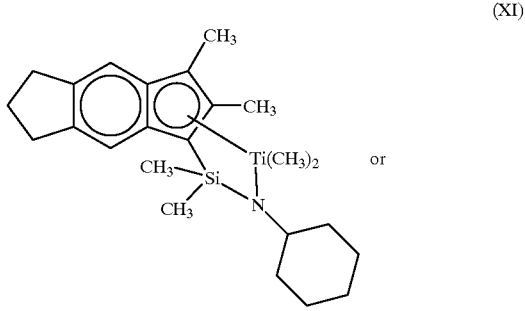

(XI)

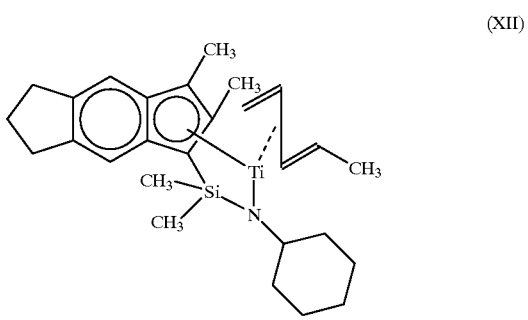

(XII)

Finally, highly useful metal complexes for use in the second component of the dual CGC catalyst system for the copolymerization of ethylene, an α-olefin and a diene, especially ethylene, propylene and a nonconjugated diene, such as ethylidenenorbornene or 1,4-hexadiene, comprise the foregoing complexes (XIV) or (XV) wherein R' is hydrogen, and R" is $C_{1-4}$ alkyl, especially methyl. Most preferred are 2-methyl-substituted s-indecenyl complexes corresponding to formula (XIII) or (XIV):

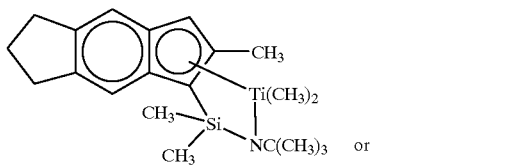

(XIII)

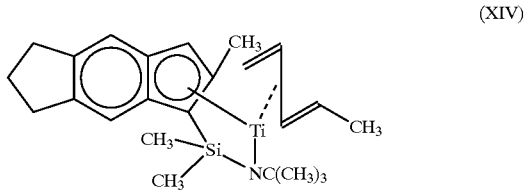

(XIV)

Illustrative metal complexes that may be employed in the preparation of the second component of the dual CGC systems of the present invention are further described in WO 98/27103.

The metal complexes used in the practice of this invention are prepared by well-known synthetic techniques. One preferred process for preparing the metal complexes is disclosed in U.S. Pat. No. 5,491,246 which is herein incorporated by reference. The reactions are conducted in a suitable noninterfering solvent at a temperature from −100 to 300 C, preferably from −78 to 100 C, most preferably from 0 to 50

C. A reducing agent may be used to cause M to be reduced from a higher to a lower oxidation state. Examples of suitable reducing agents are alkali metals, alkaline earth metals, aluminum and zinc, alloys of alkali metals or alkaline earth metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts useful in combination with the A) metal complexes are those compounds capable of abstraction of an X substituent from A) to form an inert, noninterfering counter ion, or that form a zwitterionic derivative of A). Suitable activating cocatalysts for use herein include perfluorinated tri(aryl)boron compounds, and most especially tris(pentafluorophenyl)borane; nonpolymeric, compatible, noncoordinating, ion-forming compounds (including the use of such compounds under oxidizing conditions), especially the use of ammonium, phosphonium, oxonium, carbonium, silylium or sulfonium salts of compatible, noncoordinating anions, and ferritenium salts of compatible, noncoordinating anions. Suitable activating techniques include the use of bulk electrolysis (explained subsequently in more detail). A combination of the foregoing activating cocatalysts and techniques may be employed as well. The foregoing activating cocatalysts and activating techniques have been previously taught with respect to different metal complexes in the following references: EP-A-277,003, U.S. Pat. Nos. 5,153,157, 5,064,802, EP-A-468,651, U.S. Pat. Nos. 5,721,185, 5,350,723, the U.S. patents of which are incorporated herein by reference. More particularly, suitable ion-forming compounds useful as cocatalysts in one embodiment of the present invention comprise a cation which is a Bronsted acid capable of donating a proton, and a compatible, noncoordinating anion, A–.

Preferred anions are those containing a single coordination complex comprising a charge-bearing metal or metalloid core which anion is capable of balancing the charge of the active catalyst species (the metal cation) which may be formed when the two components are combined. Also, the anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially. Preferably such cocatalysts may be represented by general formula (XV):

$$(L^*-H)_d^*(A)^{d-} \qquad (XV)$$

wherein:

L* is a neutral Lewis base;

(L*—H)⁺ is a Bronsted acid;

$A^{d-}$ is a noncoordinating, compatible anion having a charge of d–, and d is an integer from 1–3.

More preferably $A^{d-}$ corresponds to formula (XVI):

$$[M'Q_4]^- \qquad (XVI)$$

wherein:

M' is boron or aluminum in the formal +3 formal oxidation state; and

Q independently each occurrence is selected from hydride, dialkylamido, halide, hydrocarbyl, hydrocarbyloxide, halosubstituted hydrocarbyl, halosubstituted hydrocarbyloxy, and halosubstituted silylhydrocarbyl radicals (including perhalogenated hydrocarbyl perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the teachings of which are herein incorporated by reference.

In a more preferred embodiment, d is 1, that is, the counter ion has a single negative charge and is A–. Activating cocatalysts comprising boron which are particularly useful in the preparation of the first catalyst component of this invention may be represented by general formula (XVII):

$$(L^*-H)^+(BQ_4)^- \qquad (XVII)$$

wherein:

L* is as previously defined;

B is boron in a formal oxidation state of 3; and

Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are trisubstituted ammonium salts such as: trimethylammonium tetrakis(pentafluorophenyl) borate, triethylammonium tetrakis(pentafluorophenyl) borate, tripropylammonium tetrakis(pentafluorophenyl) borate, tri(n-butyl)ammonium tetrakis(pentafluorophenyl) borate, tri(sec-butyl)ammonium tetrakis(pentafluorophenyl) borate, N,N-dimethylanilinium tetrakis(pentafluorophenyl) borate, N,N-dimethylanilinium n-butyltris(pentafluorophenyl) borate, N,N-dimethylanilinium benzyltris(pentafluorophenyl)borate, N,N-dimethylanilinium tetrakis(4-(t-butyldimethylsilyl)-2,3,5,6-tetrafluorophenyl) borate, N,N-dimethylanilinium tetrakis(4-(triisopropylsilyl)-2,3,5,6-tetrafluorophenyl) borate, N,N-di(n-hexadecanyl)-N-methylammonium tetrakis (2,3,4,5,6-pentafluorophenyl) borate, N,N-dimethylanilinium pentafluorophenoxytris (pentafluorophenyl) borate, N,N-diethylanilinium tetrakis (pentafluorophenyl) borate, N,N-dimethyl-2,4,6-trimethylanilinium tetrakis(pentafluorophenyl) borate, trimethylammonium tetrakis (2,3,4,6-tetrafluorophenyl) borate, triethylammonium tetrakis (2,3,4,6-tetrafluorophenyl) borate, tripropylammonium tetrakis (2,3,4,6-tetrafluorophenyl) borate, tri(n-butyl)ammonium tetrakis (2,3,4,6-tetrafluorophenyl) borate, dimethyl(t-butyl)

ammonium tetrakis (2,3,4,6-tetrafluorophenyl) borate, N,N-dimethylanilinium tetrakis (2,3,4,6-tetrafluorophenyl) borate, N,N-diethylanilinium tetrakis (2,3,4,6-tetrafluorophenyl) borate, and N,N-dimethyl-2,4,6-trimethylanilinium tetrakis (2,3,4,6-tetrafluorophenyl) borate; disubstituted ammonium salts such as: di-(i-propyl) ammonium tetrakis(pentafluorophenyl) borate, and dicyclohexylammonium tetrakis(pentafluorophenyl) borate; trisubstituted phosphonium salts such as: triphenylphosphonium tetrakis(pentafluorophenyl) borate, tri(o-tolyl)phosphonium tetrakis(pentafluorophenyl) borate, and tri(2,6-dimethylphenyl)phosphonium tetrakis(pentafluorophenyl) borate; disubstituted oxonium salts such as: diphenyloxonium tetrakispentafluorophenyl) borate, di(o-tolyl)oxonium tetrakis(pentafluorophenyl) borate, and di(2,6-dimethylphenyl oxonium tetrakis(pentafluorophenyl) borate; disubstituted sulfonium salts such as: diphenylsulfonium tetrakis(pentafluorophenyl) borate, di(o-tolyl) sulfonium tetrakis(pentafluorophenyl) borate, and bis(2,6-dimethylphenyl)sulfonium tetrakis(pentafluorophenyl) borate.

Preferred $(L^*—H)^+$ cations are N,N-dimethylanilinium, tributylammonium and N,N-di(n-hexadecanyl)-N-methylammonium.

Another suitable ion forming, activating cocatalyst comprises a salt of a cationic oxidizing agent and a noncoordinating, compatible anion represented by formula (XVIII):

$$(Ox^{e+})_d(A^{d-})_e \qquad (XVIII)$$

wherein:

$Ox^{e+}$ is a cationic oxidizing agent having a charge of e+;

e is an integer from 1 to 3; and $A^{d-}$ and d are as previously defined.

Examples of cationic oxidizing agents include: ferrocenium, hydrocarbyl-substituted ferrocenium, $Ag^+$ or $Pb^{+2}$. Preferred embodiments of $A^{d-}$ are those anions previously defined with respect to the Bronsted acid containing activating cocatalysts, especially tetrakis (pentafluorophenyl) borate.

Another suitable ion forming, activating cocatalyst comprises a compound which is a salt of a carbenium ion and a noncoordinating, compatible anion represented by the formula (XIX):

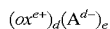$^+A^-$ (XIX)

wherein:

$^+$ is a $C_{1-20}$ carbenium ion; and $A^-$ is as previously defined. A preferred carbenium ion is the trityl cation, i.e. triphenylmethylium.

A further suitable ion forming, activating cocatalyst comprises a compound which is a salt of a silylium ion and a noncoordinating, compatible anion represented by formula (XX):

$$R^v{}_3Si^*A^- \qquad (XX)$$

wherein:

$R^v$ is $C_{1-10}$ hydrocarbyl, and A is as previously defined.

Preferred silylium salt activating cocatalysts are trimethylsilylium tetrakis(pentafluorophenyl) borate, triethylsilylium tetrakis(pentafluorophenyl) borate and ether substituted adducts thereof. Silylium salts have been previously generically disclosed in *J. Chem Soc. Chem. Comm.*, 1993, 383–384, as well as Lambert, J. B., et al, *Organometallics*, 1994, 13, 2430–2443. The use of the above silylium salts as activating cocatalysts for addition polymerization catalysts is claimed in U.S. Pat. No. 5,625,087 which is incorporated herein by reference.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, which is herein incorporated by reference.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are (i) liquids under the conditions of the electrolysis (generally temperatures from 0 to 100 C.), (ii) capable of dissolving the supporting electrolyte, and (iii) inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), dimethoxyethane (DME), and mixtures thereof.

The electrolysis may be conducted in a standard electrolytic cell containing an anode and cathode (also referred to as the working electrode and counterelectrode respectively). Suitable materials of construction for the cell are glass, plastic, ceramic and glass-coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass grit separates the cell into separate compartments, the working electrode compartment and counterelectrode compartment. The working electrode is immersed in a reaction medium comprising the metal complex to be activated, solvent, supporting electrolyte, and any other materials desired for moderating the electrolysis or stabilizing the resulting complex. The counterelectrode is immersed in a mixture of the solvent and supporting electrolyte. The desired voltage may be determined by theoretical calculations or experimentally by sweeping the cell using a reference electrode such as silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and a compatible, noncoordinating anion, $A^-$. Preferred supporting electrolytes are salts corresponding to the formula $G^+A^-$ wherein $G^+$ is a cation which is nonreactive towards the starting and resulting complex, and $A^-$ is as previously defined.

Examples of cations, $G^+$, include tetrahydrocarbyl substituted ammonium or phosphonium cations having up to 40 nonhydrogen atoms. Preferred cations are the tetra(n-butylammonium)- and tetraethylammonium-cations.

During activation of the complexes of the present invention by bulk electrolysis the cation of the supporting electrolyte passes to the counterelectrode and $A^-$ migrates to the working electrode to become the anion of the resulting oxidized product. Either the solvent or the cation of the supporting electrolyte is reduced at the counterelectrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl or perfluoroaryl group, especially tetra(n-butylammonium)tetrakis(pentafluorophenyl) borate.

A further recently discovered electrochemical technique for generation of activating cocatalysts is the electrolysis of a disilane compound in the presence of a source of a noncoordinating compatible anion. All of the foregoing techniques are more fully disclosed and claimed in U.S. Pat. No. 5,372,682 which is incorporated herein by reference. In as much as the activation technique ultimately produces a cationic metal complex, the amount of such resulting complex formed during the process can be readily determined by measuring the quantity of energy used to form the activated complex in the process.

Alumoxanes, especially methylalumoxane or triisobutylaluminum modified methylalumoxane are also suitable activators and may be used for activating the present metal complexes.

Preferred activating cocatalysts include trispentafluorophenylborane and di(hydrogenated-tallowalkyl) methylammonium tetrakis-(pentafluorophenyl) borate.

The molar ratio of metal complex:activating cocatalyst employed preferably ranges from 1:1000 to 2:1, more preferably from 1:5 to 1.5:1, most preferably from 1:2 to 1:1.

The amount of first CGC to second CGC in the mixed catalyst system can vary widely and to convenience. Typically, the minimum ratio, in weight percent based on the combined weight of the metals, of first CGC to second CGC is 1:99, preferably 5:95 and most preferably 75:25. The typical maximum ratio, again in weight percent based on the combined weight of the metals, is 99:1, preferably 95:5 and most preferably 25:75.

The reactivity ratios describe the copolymerization of the monomers $M_1$ and $M_2$ as shown in the following equations where $M_1$ is ethylene and $M_2$ is a higher α-olefin. The value of $r_1$ is used to describe the reactivity of a catalyst to comonomers with a lower value of $r_1$ indicating greater reactivity for comonomer incorporation.

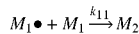 (1)

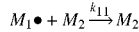 (2)

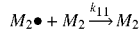 (3)

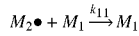 (4)

$$r_1 = k_{11}/k_{12}$$
$$r_2 = k_{22}/k_{21}$$

The comonomer concentration in the polymer and reactor are then related by:

$$\frac{dM_1}{dM_2} = \frac{M_1 r_1}{M_2 r_2} \frac{M_1 + M_2}{M_2 + M_1} \approx \frac{m_1}{m_2} \tag{7}$$

where M1 and M2 refer to the reactor concentrations, and m1 and m2 refer to the polymer composition.

The reactivity ratios can be obtained using the Fineman-Ross method in which the monomer concentrations in the reactor and in the final polymer are related at low conversions by solving equation (7) graphically and obtaining $r_1$ as the slope and the intercept being minus $r_2$.

$$\frac{M_1}{M_2} - \left(\frac{M_1}{M_2}\frac{m_2}{m_2}\right) = r_1 \left(\frac{M_1}{M_2}\right)^2 \left(\frac{m_2}{m_1}\right) - r_2 \tag{8}$$

The lower the value of $r_1$, the closer are the monomer and comonomer in reactivity, and the greater the incorporation rate of the comonomer. When two catalysts that differ in the value of $r_1$ are used together in a single reaction vessel to promote the same ethylene/α-olefin polymerization, a polymer blend will be produced, i.e., a product comprising two polymer components differing in molecular architecture. The polymer component produced through the action of the catalyst with the lower reactivity ratio will contain more comonomer than the polymer component produced through the action of the catalyst with the higher reactivity ratio. For purposes of describing this invention, catalysts with reactivity ratios that differ by more than about 50 percent from one another with respect to the polymerization of ethylene and a given α-olefin at the same temperature will produce a polymer blend in which the blend components do not have a substantially uniform molecular architecture, and catalysts with reactivity ratios that differ by about 50 percent or less, preferably 30 percent or less, from one another with respect to the polymerization of ethylene and a given α-olefin at the same temperature will produce a polymer blend in which the blend components do have a substantially uniform molecular architecture. For interpolymer blends derived from three or more comonomers, particularly those interpolymer blends in which one of the comonomers is a polyene, the molecular architecture of the blend components may not be substantially uniform even though the reactivity ratios of the catalysts differ by less than 50 percent with respect to ethylene and the α-olefin because the reactivity ratios of the catalysts may differ by more than 50 percent with respect to ethylene and the second comonomer.

In general, the polymerization may be accomplished at conditions well known in the prior art for Ziegler-Natta or Kaminsky-Sinn type polymerization reactions, that is, temperatures from 0–250 C., preferably 30 to 200 C. and pressures from atmospheric to 10,000 atmospheres. Suspension, solution, slurry, gas phase, solid state powder polymerization or other process conditions may be employed if desired. A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30.

In most polymerization reactions the molar ratio of catalyst:polymerizable compounds employed is from $10^{-12}$:1 to $10^{-1}$:1, more preferably from $10^{-9}$:1 to $10^{-5}$:1. In this ratio, "catalyst" means the mixed catalyst system. Suitable solvents for solution polymerization are inert liquids. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and alkyl-substituted aromatic compounds such as benzene, toluene, xylene, and ethylbenzene. Suitable solvents also include liquid olefins that may act as monomers or comonomers.

Utilizing the mixed catalyst system of the present invention, α-olefin homopolymers and copolymers having densities from 0.85 g/cm$^3$ to 0.97 g/cm$^3$, and Mooney viscosities of from less than 0.01 to about 150 are readily attained in a highly efficient process.

The mixed catalyst systems of the present invention are particularly advantageous for the production of ethylene homopolymers and ethylene/α-olefin copolymers having long chain branching, often high levels of long chain branching. The use of this system in continuous polymerization processes, especially continuous, solution polymerization processes, allows for elevated reactor temperatures which favor the formation of vinyl terminated polymer chains that may be incorporated into a growing polymer, thereby giving a long chain branch. Although relatively large amounts of α-olefin disfavor the formation of long chain branches, the polymerization conditions can be adjusted as taught in PCT/US97/07252 to offset, at least partially, this tendency. The use of the present catalyst compositions advantageously allows for the economical production of ethylene/α-olefin copolymers having processability similar to high pressure, free radical produced low-density polyethylene.

The mixed catalyst systems used in this invention may also be advantageously employed to prepare olefin polymers having improved processing properties by polymerizing ethylene alone or ethylene/α-olefin mixtures with low levels of a "H" branch inducing diene, such as norbornadiene, 1,7-octadiene, or 1,9-decadiene. The unique combination of elevated reactor temperatures, high molecular weight (or low melt indices) at high reactor temperatures and high comonomer reactivity advantageously allows for the economical production of polymers having excellent physical properties and processability. Preferably such polymers comprise ethylene, a $C_{3-20}$ (α-olefin and a "H"-branching comonomer. Preferably, such polymers are produced in a solution process, most preferably a continuous solution process.

The individual catalyst components of the mixed catalyst system may be prepared as a homogeneous catalyst by addition of the requisite components to a solvent in which polymerization will be carried out by solution polymerization procedures. These catalyst components may also be prepared and employed as a heterogeneous catalysts by adsorbing the requisite components on an inert inorganic or organic particulated solid. Examples of such solids include, silica, silica gel, alumina, trialkylaluminum compounds, and organic or inorganic polymeric materials, especially polyolefins. In an preferred embodiment, a heterogeneous catalyst is prepared by coprecipitating the metal complex, an inert, inorganic compound and an activator, especially an ammonium salt of a hydroxyaryl(trispentafluorophenyl) borate, such as an ammonium salt of (4-hydroxy-3,5-ditertiarybutylphenyl)(trispentafluorophenylborate. A preferred inert, inorganic compound for use in this embodiment is a tri ($C_{1-4}$ alkyl) aluminum compound.

When prepared in heterogeneous or supported form, the catalyst compositions are employed in a slurry or gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably at least a major part of the diluent comprises the α-olefin monomer or monomers to be polymerized.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of an dry, inert gas such as, for example, nitrogen.

The polymerization may be carried out as a batchwise or a continuous polymerization process. A continuous process is preferred, in which event the mixed catalyst system, ethylene, comonomer, and optionally solvent are continuously supplied to the reaction zone and from which polymer product is continuously removed.

Without limiting in any way the scope of the invention, one means for carrying out such a polymerization process is as follows: In a stirred-tank reactor, the monomers to be polymerized are introduced continuously together with solvent and an optional chain transfer agent. The reactor contains a liquid phase composed substantially of monomers together with any solvent or additional diluent and dissolved polymer. If desired, a small amount of a "H"-branch inducing diene such as norbornadiene, 1,7-octadiene or 1,9-decadiene may also be added. The metal complexes and cocatalysts of the mixed catalyst system are continuously introduced into the reactor liquid phase.

The reactor temperature and pressure are controlled by adjusting the solvent/monomer ratio, the catalyst addition rate, as well as by cooling or heating coils, jackets or both. The polymerization rate is controlled by the rate of catalyst addition. The ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or by the previously mention chain transfer agent, such as a stream of hydrogen introduced to the reactor, as is well known in the art.

The reactor effluent is contacted with a catalyst kill agent such as water or alcohol. The polymer solution is optionally heated, and the polymer product is recovered by flashing off gaseous monomers as well as residual solvent or diluent at reduced pressure, and, if necessary, s conducting further devolatilization in equipment such as a devolatilizing extruder. In a continuous process the mean residence time of the catalyst and polymer in the reactor generally is from about 5 minutes to 8 hours, and preferably from 10 minutes to 6 hours. By using a mixed catalyst system that incorporates large amounts of hindered monovinyl monomer, hindered monovinyl homopolymer formed from residual quantities of the monomer are substantially reduced.

In one embodiment of this invention, the single reaction vessel in which the polymer blend is prepared is one reactor of a multiplicity of reactors deployed either in parallel or in series. In such deployments, the polymer blend of the single reaction vessel can be a feed to a subsequent reactor (series deployment), or it can be blended with the output from another reactor (parallel deployment).

The polymer blends of this invention have a wide range of uses. The blends are useful in the manufacture of molded articles such as toys, toy parts, sporting goods, medical goods, soft touch parts of a relatively low shore A hardness, and automotive parts, and extruded goods such as tubing and profiles. Other applications for these blends include wire and cable, footwear, building and construction materials, adhesives, films and fibers, flooring, foams, weather stripping, oil modification, general rubber goods, extruded sheets, instrument panel skins, food packaging, electronic components and the like. These blends can be crosslinked by any of the various crosslinking agents, e.g., peroxide, sulfur, phenolics, azides and radiation, and/or grafted using maleic anhydride, silane or one or more of the other reactive monomers which can modify the functional performance of the blend. These blends can also be mixed with other materials such as thermoplastic olefins, elastomers and vulcanizates for use in various extrusion, injection molding, calendering, rotomolding, slush molding, blow molding, thermoforming and compression molding applications.

EXAMPLES

The skilled artisan will appreciate that the present invention disclosed may be practiced in the absence of any component which has not been specifically disclosed. The following examples are provided as further illustration of the invention and are not to be construed as limiting. Unless stated to the contrary all parts and percentages are expressed on a weight basis.

Batch Reactor Run Description

Additive solution: The additive solution is prepared by dissolving PEPQ (an antioxidant from Sandoz) and Irganox 1076 (a hindered phenolic antioxidant from Ciba-Geigy) in 500 ml of toluene. The concentration of the solution is 20 mg of total additive per 1 ml of solution.

Polymerization: A typical run using a mixed catalyst system is described. A one-gallon stirred reactor is charged with Isopar E (mixed alkanes; available from Exxon Chemicals Inc.), octene-1, hydrogen and, if desired, 5-ethylidene-2-norbornene (ENB). If ENB is added, then it is added to the reactor prior to the addition of hydrogen. All liquid components are measured by mass flow. The reactor is heated to the desired temperature and saturated with ethylene.

The catalyst is prepared in a drybox by syringing together the appropriate components with additional solvent to give a total volume of 18 ml. In mixed catalyst runs, the two components are added in molar ratio of metal (1 to 1 unless stated otherwise in the Tables). The catalyst solution is then transferred by syringe to a catalyst addition loop and injected into the reactor over approximately 4 minutes using a flow of high-pressure solvent. An exotherm of about 10 C. is observed. The polymerization is allowed to proceed for 10 minutes while feeding ethylene on demand to maintain a relatively constant pressure (typically between 450 and 465 psi. The maximum flow of ethylene is typically about 20 g/min. The amount of ethylene consumed during the reaction is monitored using a mass flowmeter.

The polymer solution is then dumped from the reactor into a nitrogen-purged glass kettle. An aliquot of the additive solution described above is added to this kettle and the solution stirred thoroughly (the amount of additive used is chosen based on the total ethylene consumed during the polymerization to produce 1000 ppm of each additive in the polymer). The polymer solution is dumped into a tray, air dried overnight, then thoroughly dried in a vacuum oven for one day. Some of the polymers and polymer blends are then measured according to ASTM tests for tensile @ break, elongation @ break, $I_2$ and $I_{10}$.

Table 1A reports the batch reactor preparation of ethylene/1-octene polymer blends and polymers using two mixed catalyst systems (A/B in Runs 1–6, and B/C in Runs 7–9) and the individual catalyst components of the systems, respectively, along with selected physical characteristics of the polymers and polymer blends. Runs 4–6 are conducted at a temperature of about 20 C. greater than Runs 1–3. Runs 3 and 6 are representative of the process and polymer blends of this invention. Run 9 reports a comparative process and polymer blend. Tables 1B, 1C and 1D report similar information for ethylene/propylene/ENB, ethylene/butene/ENB and ethylene/butene polymer blends and polymers.

TABLE 1A

Batch Reactor Operational Data and Polymer Blend Properties of Ethylene/1-Octene Polymers and Polymer Blends

| Run Number | 1 | 2 | 3 | 4 | 5 | 6 |
|---|---|---|---|---|---|---|
| Catalyst* | A | A/B | B | A | A/B | B |
| Temp, C. | 89.5 | 89.4 | 89.9 | 109.9 | 109.9 | 109.9 |
| 1-Octene, g | 351.4 | 351.1 | 350.9 | 450.2 | 451.2 | 450.1 |
| Ti, µmole | 1.50 | 1.25 | 1.25 | 1.75 | 1.75 | 1.50 |
| B/Ti | 4.00 | 3.96 | 3.96 | 4.03 | 4.03 | 4.00 |
| Al/Ti | 5.00 | 5.20 | 5.20 | 5.14 | 5.14 | 5.00 |
| Exotherm C | 8.7 | 9.2 | 6.0 | 4.1 | 8.2 | 5.3 |
| $C_2$ Flow, max | 20.1 | 19.7 | 15.8 | 21.3 | 25.0 | 20.6 |
| $C_2$ rate end | 0 | 0.4 | 0 | 0 | 0 | 0 |
| $C_2$ used, g | 54.8 | 59.4 | 52.1 | 43.3 | 62.8 | 50.5 |
| Calculated Efficiency | 763,105 | 992,506 | 870,864 | 516,887 | 749,018 | 703,031 |
| Solvent, g | 1504.3 | 1505.4 | 1500.2 | 1402.7 | 1402.3 | 1405.0 |
| Pressure, psig | 457.4 | 456.8 | 458.1 | 456.3 | 456.6 | 456.1 |
| $C_2$ load, g | 212.0 | 214.6 | 212.6 | 181.0 | 182.5 | 182.2 |
| $C_2$ pressure, psig | 444.3 | 443.8 | 445.6 | 437.7 | 439.7 | 439.2 |
| $H_2$ mmole | 8.0 | 8.0 | 8.0 | 8.1 | 8.2 | 8.2 |
| Mw | 72,400 | 130,700 | 198,800 | 49,500 | 87,000 | 125,200 |
| Mn | 39,100 | 54,600 | 102,500 | 25,800 | 35,800 | 63,000 |
| MWD | 1.85 | 2.39 | 1.94 | 1.92 | 2.43 | 1.99 |
| Mw1 | — | 222,827 | — | — | 150,081 | — |
| Mw2 | — | 74,454 | — | — | 51,747 | — |
| MW Ratio Hi/Lo | — | 2.99 | — | — | 2.90 | — |
| $I_2$ | 6.27 | 0.796 | 0.16 | 30.99 | 4.35 | 0.99 |
| $I_{10}$ | 38.62 | 6.00 | 0.93 | 188.02 | 33.35 | 6.41 |
| $I_{10}/I_2$ | 6.2 | 7.5 | 5.8 | 6.1 | 7.7 | 6.5 |
| DSC Tm Peak Melting | 67.69 | 62.87 | 59.91 | 65.42 | 59.65 | 50.95 |
| % Crystallized | 23.09 | 19.85 | 17.89 | 21.07 | 19.58 | 15.06 |

TABLE 1A-continued

Batch Reactor Operational Data and Polymer Blend Properties
of Ethylene/1-Octene Polymers and Polymer Blends

| | | | | | | |
|---|---|---|---|---|---|---|
| DSC Tg | −51.69 | −54.99 | −51.35 | −52.56 | −53.47 | −58.13 |
| Tc (onset) | 53.03 | 50.35 | 48.58 | 53.19 | 48.31 | 40.37 |
| Tc (peak) | 50.09 | 47.89 | 45.95 | 47.24 | 44.13 | 36.18 |
| J/g | 70.05 | 61.26 | 53.02 | 54.55 | 54.49 | 48.64 |

| Run Number | 7 | 8 | 9 (Comp) |
|---|---|---|---|
| Catalyst* | B | C | C/B |
| Temp, C. | 109.9 | 110.1 | 109.6 |
| Octene, g | 750.7 | 750.9 | 750.6 |
| Ti, μmole | 1.50 | 1.50 | 1.40 |
| B/Ti | 4.00 | 4.00 | 3.96 |
| Al/Ti | 5.00 | 5.00 | 5.00 |
| Exotherm C | 3.5 | 3.9 | 1.9 |
| $C_2$ Flow, max | 17.1 | 22.3 | 10.2 |
| $C_2$ rate end | 0 | 0.1 | 0.2 |
| $C_2$ used, g | 38.7 | 28.3 | 13.1 |
| Calculated Efficiency | 538,701 | 393,199 | 196,149 |
| Solvent, g | 1078.2 | 1081.2 | 1081.5 |
| Pressure, psig | 456.1 | 455.5 | 456.3 |
| $C_2$ load, g | 185.7 | 184.9 | 186.6 |
| $C_2$ press | 443.4 | 442.1 | 443.4 |
| $H_2$ mmole | 1.6 | 1.6 | 1.6 |
| Mw | 142,400 | 324,700 | 253,600 |
| Mn | 74,100 | 182,000 | 104,000 |
| MWD | 1.92 | 1.78 | 2.44 |
| Mw1 | — | — | 359,791 |
| Mw2 | — | — | 124,571 |
| MW Ratio Hi/Lo | — | — | 2.89 |
| DSC Peak Melting | Broad | 66.51 | 78.38 |
| % Crystallized | 10.23 | 23.20 | 20.19 |
| DSC Tg | −59.77 | −46.05 | −61.49 |
| Tc (onset) #1 | 10.10 | 66.51 | 68.39 |
| Peak Cooling #1 | 0.31 | 63.94 | 65.79 |
| J/G #1 | 30.54 | 67.74 | 54.56 |
| Tc (onset) #2 | — | — | — |
| Peak Cooling #2 | — | — | −0.89 |

*A - (t-butylamido)dimethyl(tetramethylcyclopentadienyl)silanetitanium 1,3-pentadiene.
B - (t-butylamido)dimethyl(2-methyl-s-indacen-1-yl)silanetitanium 1,3-pentadiene.
C [N-(1,1-dimethylethyl)-1,1-dimethyl-1-1-((1,2,3,3a,7a-h)-3-(1-pyrrolidinyl)-1H-inden-1-yl)
silanaminato-(2-)-N][(2,3,4,5,-h)-2,4-pentadiene)]-titanium.

As the data of Runs 1–6 shows, polymer blends made with a mixed catalyst system have a larger MWD than the polymers made under similar polymerization conditions with only one of the mixed catalyst components (compare Runs 1 and 2 with 3; and Runs 4 and 5 with 6). Moreover, the polymer blends of Runs 3 and 6 have a substantially uniform molecular architecture as demonstrated by a single DSC Tm melting peak. In contrast, although Runs 7–9 also report that the blend has a larger MWD than the polymers made under similar polymerization conditions with only one of the mixed catalyst components (compare Runs 7 and 8 with 9), the components of the blend do not have a substantially uniform molecular architecture as demonstrated by the presence of two DSC peaks (note Peak Cooling #2). These results are consistent with the similarity in reactivity ratios of Catalysts A and B, and the dissimilarity in reactivity ratios between Catalysts B and C, with respect to ethylene and 1-octene, all as reported in Table 7A.

Also of interest is the fact that the high Mw/low Mw ratio is relatively constant over Runs 3, 6 and 9 despite a 20 C. temperature difference and the use of catalysts, i.e., A and B vs. C, of different reactivity ratios (as reported in Table 7A). In addition, the $I_{10}/I_2$ (rheology ratio) of the polymer blends made by the mixed catalyst system shows higher shear sensitivity which equates to improved processability in injection molded, extrusion or blow molded applications.

TABLE 1B

Batch Reactor Operational Data and Physical Properties
of Ethylene/Propylene/ENB Polymers and Polymer Blends

| Run Number | Percent Catalyst A* | Percent Catalyst B* | Propylene mass, g | ENB mass, g | Temp, C | $H_2$ mmol | Ethylene mass, g | Ethylene partial pressure, psig |
|---|---|---|---|---|---|---|---|---|
| 10 | 100% | 0% | 200.8 | 40.2 | 99.8 | 12.50 | 143.7 | 318.3 |
| 11 | 75% | 25% | 200 | 40.3 | 99.9 | 12.10 | 148.6 | 321.4 |
| 12 | 50% | 50% | 202 | 40.1 | 100.3 | 12.00 | 149.5 | 328.8 |
| 13 | 25% | 75% | 201.2 | 40.3 | 99.7 | 12.2 | 149.6 | 329.7 |
| 14 | 0% | 100% | 201.1 | 40.2 | 100.4 | 12.3 | 150.3 | 335 |

TABLE 1B-continued

Batch Reactor Operational Data and Physical Properties
of Ethylene/Propylene/ENB Polymers and Polymer Blends

| Run Number | Percent Catalyst A | Efficiency MM lb PE/lb Ti | Ti μmole | B/Ti Ratio | Al/Ti Ratio | Exotherm, C | Max, Temp, C | Solvent mass, g | Total Press, psig |
|---|---|---|---|---|---|---|---|---|---|
| 10 | 100 | 1.36 | 1 | 3 | 10 | 3.3 | 103.1 | 1401.3 | 461.50 |
| 11 | 75 | 1.82 | 1 | 3 | 10 | 3.7 | 103.6 | 1403.8 | 458.50 |
| 12 | 50 | 1.71 | 1.5 | 3 | 10 | 9.3 | 109.6 | 1403.1 | 463.90 |
| 13 | 25 | 1.67 | 1.25 | 3 | 10 | 3.4 | 103.1 | 1406.3 | 462.4 |
| 14 | 0 | 1.15 | 1.5 | 3 | 10 | 2.2 | 102.6 | 1405.1 | 462.2 |

| Run Number | GPC Mw | GPC Mn | GPC MWD | Mw1 | Mw2 | Hi/Lo Mw Ratio | Tc(onset) C | Tc (peak)C | Tg C | Tm C |
|---|---|---|---|---|---|---|---|---|---|---|
| 10 | 174700 | 87700 | 1.99 | — | 52353 | — | 10.98 | 5.73 | −40.42 | 3.77 |
| 11 | 165500 | 63700 | 2.6 | 174700 | 51165 | 4.15 | 12.73 | 7.21 | −41.58 | 9.01 |
| 12 | 123800 | 41700 | 2.97 | 217056 | 51423 | 3.96 | 14.95 | 9.17 | −41.68 | 7.3 |
| 13 | 93900 | 33100 | 2.84 | 202696 | 56900 | 3.73 | 18.87 | 12.04 | −41.52 | 10.41 |
| 14 | 56900 | 30200 | 1.88 | 191659 | — | — | 21.62 | 13.59 | −42.94 | 6.73 |

| Run Number | FTIR± Method | FTIR± Percent Ethylene | FTIR± Percent Propylene | FTIR± Percent ENB | Ethylene/propylene ratio | Density | % Xtal |
|---|---|---|---|---|---|---|---|
| 10 | EPDM | 67.1 | 26.2 | 6.7 | 71.9/28.1 | 0.867 | 10.47 |
| 11 | EPDM | 66.4 | 27.8 | 5.8 | 70.5/29.5 | 0.865 | 10.78 |
| 12 | EPDM | 66.4 | 28.6 | 5.0 | 69.9/30.1 | 0.865 | 11.71 |
| 13 | EPDM | 66.9 | 28.3 | 4.8 | 70.3/29.7 | 0.866 | 13.51 |
| 14 | EPDM | 66.0 | 30.2 | 3.9 | 68.6/31.4 | 0.863 | 13.83 |

| Run Number | Percent Catalyst A | Tensile @ Break (psi) | Elongation @ Break(%) | $I_2$ @ 190C/2.16 kg | $I_{10}$ @ 190C/10.1 kg | $I_{10}/I_2$ @190C |
|---|---|---|---|---|---|---|
| 10 | 100 | 381 | 1988 | 0.20 | 1.23 | 6.26 |
| 11 | 75 | 445 | 1699 | 0.23 | 1.50 | 6.51 |
| 12 | 50 | 403 | 1904 | 0.80 | 6.64 | 8.28 |
| 13 | 25 | 438 | 1999 | 2.42 | 21.52 | 8.88 |
| 14 | 0 | 102 | 306 | 17.14 | 102.48 | 5.98 |

A*-(t-butylamido)dimethyl(tetramethylcyclopentadienyl)silanetitanium 1,3-pentadiene.
B-(t-butylamido)dimethyl(2-methyl-s-indacen-1-yl)silanetitanium 1,3-pentadiene.
±Fourier Transformation Infrared Spectroscopy.

TABLE 1C

Batch Reactor Operational Data and Physical Properties
of Ethylene/Propylene/ENB Polymers and Polymer Blends

| Run Number | Percent Catalyst A* | Percent Catalyst B* | Propylene mass, g | ENB mass, g | Temp, C | $H_2$ mmol | Ethylene mass, g | Ethylene partial pressure, psig |
|---|---|---|---|---|---|---|---|---|
| 15 | 100% | 0% | 265.5 | 40.0 | 100 | 12.2 | 185.6 | 399.7 |
| 16 | 75% | 25% | 265.2 | 40.5 | 100.1 | 12.2 | 183 | 395.3 |
| 17 | 50% | 50% | 265.4 | 40.4 | 99.4 | 12 | 183.6 | 392.9 |
| 18 | 25% | 75% | 265.5 | 40.4 | 99.7 | 12.1 | 182 | 391.3 |
| 19 | 0% | 100% | 265 | 40.2 | 100.3 | 12.2 | 182.4 | 399.4 |

| Run Number | Percent Catalyst A | Efficiency MM lb PE/lb Ti | Ti μmole | B/Ti Ratio | Al/Ti Ratio | Exotherm, C | Max, Temp, C | Solvent mass, g | Total Press, psig |
|---|---|---|---|---|---|---|---|---|---|
| 15 | 100% | 1.94 | 1 | 3 | 10 | 4.7 | 104.7 | 1401 | 463.5 |
| 16 | 75% | 2.96 | 0.75 | 3 | 10 | 5.7 | 105.8 | 1401.1 | 463.7 |
| 17 | 50% | 2.4 | 1 | 3 | 10 | 7.2 | 106.6 | 1405.7 | 462.2 |
| 18 | 25% | 2.34 | 0.75 | 3 | 10 | 4.3 | 104 | 1401.4 | 462 |
| 19 | 0% | 0.96 | 2.5 | 3 | 10 | 3.6 | 103.9 | 1406.6 | 467.5 |

| Run Number | GPC Mw | GPC Mn | GPC MWD | Mw1 | Mw2 | Hi/Lo Mw Ratio | Tc(onset) C | Tc (peak)C | Tg C | Tm C |
|---|---|---|---|---|---|---|---|---|---|---|
| 15 | 163800 | 87900 | 1.86 | — | 56773 | — | 33.13 | 28.52 | −44.47 | 43.99 |
| 16 | 145300 | 60400 | 2.41 | 163800 | 53056 | 3.06 | 41.88 | 33.94 | −44.71 | 40.38 |
| 17 | 113400 | 45300 | 2.5 | 173465 | 51459 | 3.38 | 44.19 | 38.94 | −42.80 | 42.65 |
| 18 | 84700 | 36300 | 2.33 | 179418 | 55200 | 3.68 | 47.22 | 42.81 | −47.01 | 58.52 |
| 19 | 55200 | 29900 | 1.85 | 189163 | — | — | 50.18 | 46.67 | −42.15 | 62.74 |

TABLE 1C-continued

Batch Reactor Operational Data and Physical Properties
of Ethylene/Propylene/ENB Polymers and Polymer Blends

| Run Number | FTIR± Method | FTIR± Percent Ethylene | FTIR± Percent Butene | FTIR± Percent ENB | Ethylene/Butene ratio | Density | % Xtal |
|---|---|---|---|---|---|---|---|
| 15 | EBDM | 75.68 | 19.16 | 5.16 | 79.80/20.20 | 0.882 | 13.95 |
| 16 | EBDM | 75.47 | 19.89 | 4.65 | 79.14/20.86 | 0.885 | 15.87 |
| 17 | EBDM | 76.65 | 19.38 | 3.98 | 79.82/20.18 | 0.882 | 16.87 |
| 18 | EBDM | 76.98 | 19.75 | 3.27 | 79.58/20.42 | 0.886 | 18.29 |
| 19 | EBDM | 79.31 | 18.18 | 2.52 | 81.35/18.65 | 0.888 | 18.78 |

| Run Number | Percent Catalyst A | Tensile @ Break (psi) | Elongation @ Break(%) | $I_2$ @ 190C/2.16 kg | $I_{10}$ @ 190C/10.1 kg | $I_{10}/I_2$ @190C |
|---|---|---|---|---|---|---|
| 15 | 100 | 1142 | 784 | 0.19 | 1.29 | 6.79 |
| 16 | 75 | 1185 | 842 | 0.37 | 2.67 | 7.22 |
| 17 | 50 | 1154 | 908 | 1.03 | 7.86 | 7.63 |
| 18 | 25 | 1288 | 1208 | 3.98 | 31.4 | 7.88 |
| 19 | 0 | 1054 | 1052 | 16.2 | 95.3 | 5.89 |

A*-(t-butylamido)dimethyl(tetramethylcyclopentadienyl)silanetitanium 1,3-pentadiene.
B-(t-butylamido)dimethyl(2-methyl-s-indacen-1-yl)silanetitanium 1,3-pentadiene.
±Fourier Transformation Infrared Spectroscopy.

TABLE 1D

Batch Reactor Operational Data and Polymer Blend Properties
of Ethylene/1-Butene Polymers and Polymer Blends

| Run Number | EB-1 | EB-2 | EB-3 |
|---|---|---|---|
| Catalyst* | A | B | A/B |
| Temp, C. | 100.4 | 100.0 | 100.1 |
| 1-Butene, g | 351.4 | 351.1 | 351.2 |
| Ti, µmole | 1.0 | 0.50 | 0.65 |
| B/Ti | 3.0 | 3.0 | 3.0 |
| Al/Ti | 10.0 | 10.0 | 10.0 |
| Exotherm C | 10.2 | 5.9 | 4.0 |
| $C_2$ Flow, max | 22.6 | 17.6 | 17.3 |
| $C_2$ rate end | 0 | 0 | 0 |
| $C_2$ used, g | 85.9 | 57.4 | 52.0 |
| Calculated Efficiency | 1,794,134 | 2,369,572 | 1,669,132 |
| Solvent, g | 1401.5 | 1406.1 | 1403.2 |
| Pressure, psig | 455.1 | 452.4 | 452.4 |
| $C_2$ load, g | 171.8 | 174.2 | 172.5 |
| $C_2$ pressure, psig | 376.5 | 373.8 | 374.5 |
| $H_2$ mmole | 6.6 | 6.4 | 6.6 |
| Mw | 62,800 | 178,300 | 137,500 |
| Mn | 32,800 | 86,500 | 57,300 |
| MWD | 1.91 | 2.06 | 2.40 |
| Mw1 | — | — | 69,213 |
| Mw2 | — | — | 207,262 |
| MW Ratio Hi/Lo | — | — | 2.995 |
| $I_2$ | 10.5 | 0.31 | 0.82 |
| $I_{10}$ | 64.8 | 1.83 | 5.45 |
| $I_{10}/I_2$ | 6.17 | 5.90 | 6.65 |
| Density (g/cm³) | 0.872 | 0.866 | 0.868 |
| DSC Tm Peak Melting | 56.02 | 37.34 | 32.01 |
| % Crystallized | 14.27 | 11.05 | 12.5 |
| DSC Tg | −51.56 | −53.54 | −54.46 |
| Tc (onset) | 46.78 | 30.43 | 42.26 |
| Tc (peak) | 40.92 | 19.1 | 17.78 |
| J/g | 41.67 | 32.26 | 36.51 |

*A - (t-butylamido)dimethyl(tetramethylcyclopentadienyl)silanetitanium 1,3-pentadiene.
B - (t-butylamido)dimethyl(2-methyl-s-indacen-1-yl)silanetitanium 1,3-pentadiene.

Like the data of Table 1A, the data reported in Tables 1B, 1C and 1D shows that polymer blends made with a mixed catalyst system have a larger MWD than the polymers made under similar polymerization conditions with only one of the mixed catalyst components. This broaden MWD is obtained for elastomeric blends (i.e., polymer blends of low density, e.g., less than 0.89 g/cm³) without sacrificing, and in certain cases with an improvement to, the desirable physical properties of the polymers. Moreover, the polymer blend components have a substantially uniform molecular architecture, at least with respect to the polymer units derived from ethylene and the α-olefin, because the reactivity ratios of Catalysts A and B are similar with respect to ethylene and the a-olefin as reported in Tables 7A–C.

Continuous Reactor Run Description

Ethylene/octene compositions are prepared in a continuous reactor designed for continuous addition of reactants and continuous removal of polymer solution, devolatilization and polymer recovery. Primary catalyst 1 for all samples is (t-butylamido)dimethyl(2-methyl-s-indacen-1-yl)silanetitanium 1,3-pentadiene. Primary catalyst 2 for all samples is (t-butylamido)dimethyl(tetramethylcyclopentadienyl)silanetitanium 1,3-pentadiene. The primary cocatalyst for all samples is trispentafluorophenyl borane. The secondary cocatalyst for all samples is triisobutyl aluminum modified methylalumoxane.

Referring to FIG. 1, ethylene, octene-1, and hydrogen are combined into single stream 10 before mixed with a diluent comprising Isopar-E to form combined feed mixture stream 11 that is continuously injected into reactor 12. Primary catalyst 1, primary catalyst 2, and a blend of the primary cocatalyst and secondary cocatalyst are combined into single stream 13 which is also continuously injected into reactor 12.

Reactor exit stream 14 is continuously introduced into separator 15 in which molten polymer is continuously separated from the unreacted comonomer, unreacted ethylene, unreacted hydrogen, and solvent. Unreacted materials 16 may be recycled to the reactor by way of combined feed mixture stream 11. The molten polymer is subsequently strand chopped or pelletized (in pelletizer 17) and after being cooled, is collected (typically as pellets).

TABLE 2

Continuous Reactor Operational Date and Polymer Blend Properties

| Run Number | 20 | 21 | 22 |
|---|---|---|---|
| Pilot Plant Conditions | | | |
| Primary Catalyst Ratio | 50/50 | 60/40 | 50/50 |
| Primary Catalyst 1* Feed (pph) | 0.63 | 0.85 | 0.62 |
| Primary Catalyst 2* Feed (pph) | 0.63 | 0.56 | 0.62 |
| Primary Cocatalyst Feed (pph) | 0.44 | 0.45 | 0.42 |
| Second Cocatalyst Feed (pph) | 0.43 | 0.52 | 0.48 |
| Primary Catalyst 1 Conc. (ppm) | 10 | 10 | 10 |
| Primary Catalyst 2 Conc. (ppm) | 10 | 11 | 10 |
| Primary Cocatalyst Conc. (ppm) | 1250 | 1404 | 1250 |
| Secondary Cocatalyst Conc. (ppm) | 125 | 125 | 125 |
| Primary Cocatalyst molar ratio | 4.0 | 4.9 | 3.91 |
| Second Cocatalyst molar ratio | 7.36 | 9.6 | 8.4 |
| Reactor temperature (C.) | 80.9 | 81.3 | 88.9 |
| Reactor Pressure (psi) | 476.5 | 469.1 | 474.3 |
| Ethylene Feed (pph) | 30.1 | 30.3 | 29.0 |
| Octene Feed (pph) | 35.1 | 36.2 | 28.9 |
| Ethylene Conversion (%) | 78.7 | 81.0 | 82.7 |
| Solvent flow (pph) | 359.6 | 379.9 | 243 |
| Solids (%) | 9.8 | 9.9 | 13.1 |
| Production Rate (pph) | 39.5 | 42.0 | 37.6 |
| Product Properties | | | |
| Mooney | 49.9 | 54.7 | 33.1 |
| Mw1 (weight ave. mol. wt.) | 262976 | 267269 | 208088 |
| Mw2 (weight ave. mol. wt.) | 88310 | 90245 | 70390 |
| Mw1/Mw2 | 2.98 | 2.96 | 2.96 |
| Overall Mw (weight ave. mol. wt.) | 183377 | 188425 | 148463 |
| Mw/Mn | 2.83 | 2.75 | 2.76 |
| 190C Viscosity @ 0.1 rad/sec | 453300 | 568590 | 289730 |
| 190C Viscosity @ 100 rad/sec | 27837 | 31714 | 22092 |
| Rheology ratio (0.1/100) | 16.28 | 17.93 | 13.11 |
| Density (g/cm$^3$) | 0.8657 | 0.8675 | 0.8705 |
| DSC peak cooling point (C.) | 38.85 | 40.76 | 45.69 |
| DSC peak melting point (C.) | 52.89 | 56.25 | 54.98 |

Table 2 shows the ratio of primary catalyst 1 to primary catalyst 2, primary catalysts 1 and 2 feed in pounds per hour (pph), primary and secondary cocatalyst feeds in pph, catalyst component concentrations in parts per million parts of metal (ppm), catalyst molar ratios of cocatalyst metal species (B or Al) to total metal (Ti) concentration in the catalyst, reactor temperature in degrees Centigrade, reactor pressure in psi, solvent flow rates in pph, and ethylene ($C_2$) and octene ($C_8$) in pph. Table 2 also shows the percent conversion of ethylene, percent polymer or solids in the reactor, polymer production rate in pph, and polymer properties (Mooney, molecular weight, rheology, density and DSC data). Hydrogen is not used in these runs.

The data reported in Table 2 clearly demonstrate that the mixed catalyst systems produce broad MWD polymer blends in an efficient and facile manner. This is illustrated further by the viscosity shear rate curve at 190 C. of FIG. 2, and the Gottfert Rheotens data of FIG. 3.

Figure 2:
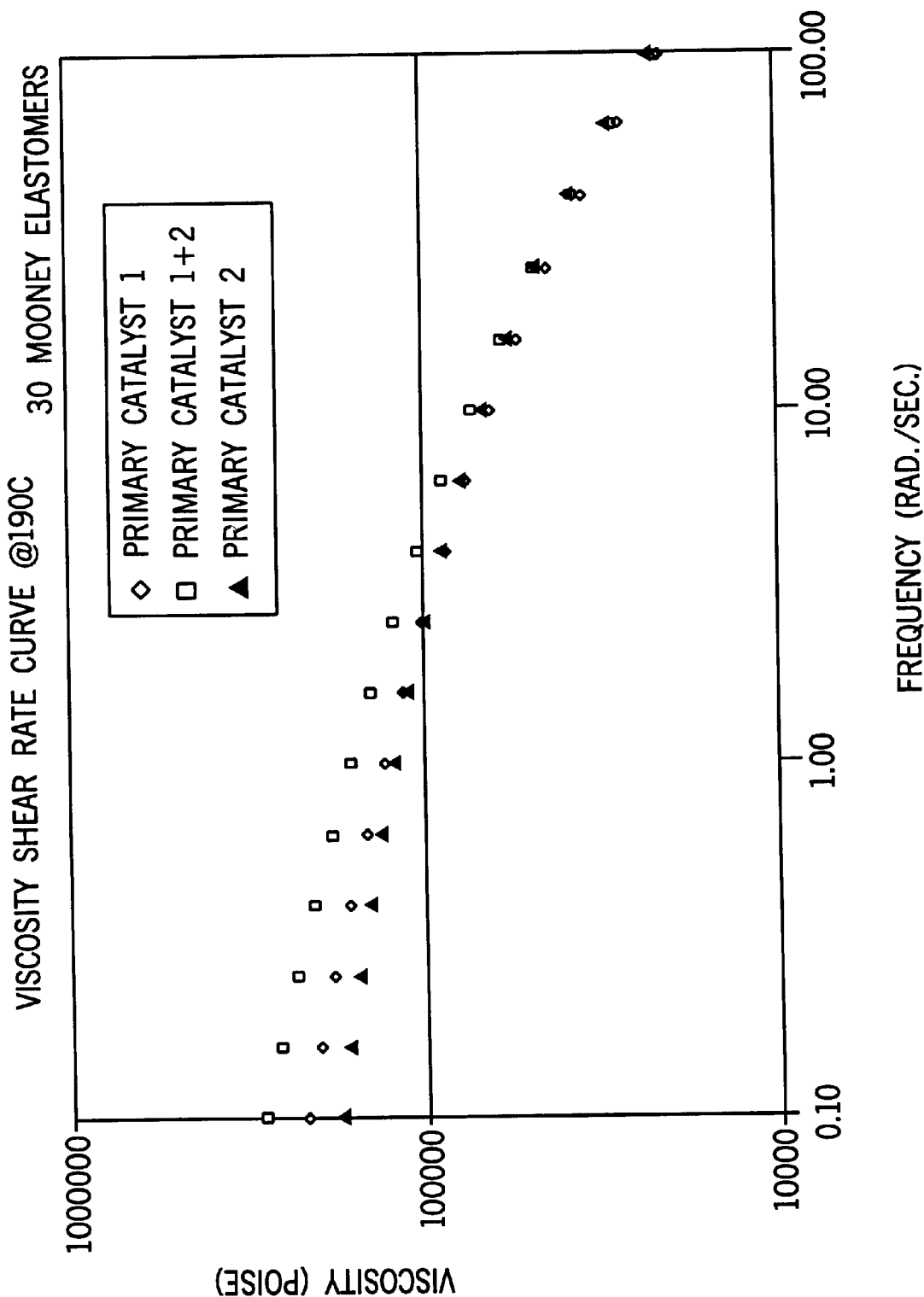
FIG. 2 is a viscosity shear rate curve at 190 C. reporting the superior processability of 30 Mooney ethylene/1-octene elastomer blend made with a dual GCG system as compared to elastomers made with only one component of the dual CGC system.

FIG. 2 shows a 190 C. viscosity versus frequency (rad/sec) relationship for two polymers and one polymer blend each of about 30 Mooney viscosity measured at 125 C. One of the polymers was produced using primary catalyst 1, and the other was produced using primary catalyst 2. Both of these polymers are of a narrower MWD (about 2.0) as compared to the polymer blend produced using a mix of primary catalysts 1 and 2 (i.e., a mixed CGC system). Since the mixed CGC system produced a polymer blend with a broader MWD than either of the blend components, FIG. 2 reports a higher shear thinning behavior (i.e., the rate of change in viscosity at different shear rates). This means that the polymer blend will process through fabrication equipment better (e.g., more will process through a given piece of equipment per unit of time at fixed conditions) than its individual components.

Figure 3:
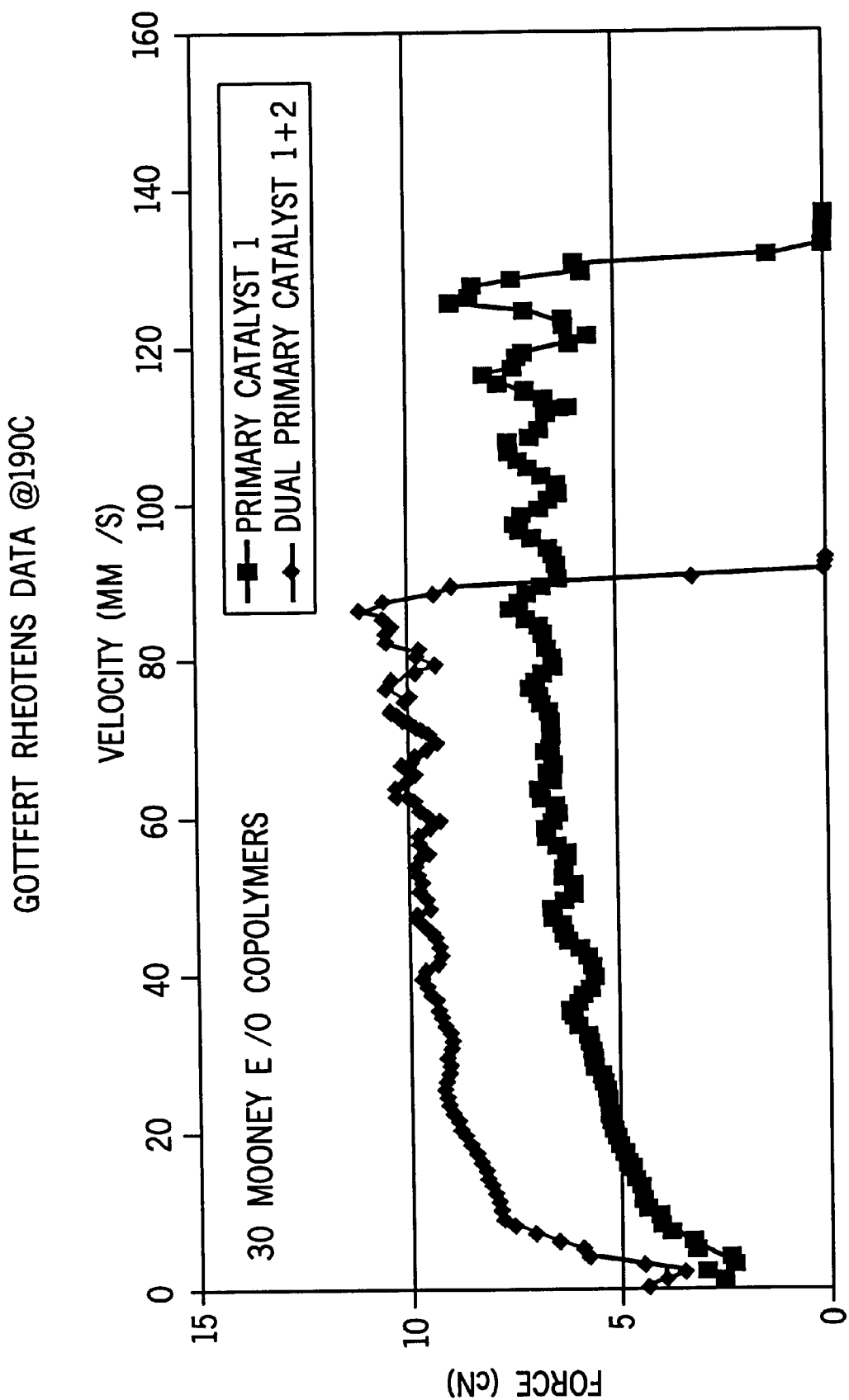
FIG. 3 is Gottfert Rheotens Data at 190 C. reporting the superior melt strength of 30 Mooney ethylene/1-octene elastomer blend made with a dual GCG system as compared to an elastomer made with only one component of the dual CGC system.

FIG. 3 also reports the comparison between two products having about 30 Mooney viscosity. One of the two products was made using primary catalyst 1, and the second was made using a mixed CGC system of which one of the components was primary catalyst 1. In spite of the two polymers having similar a Mooney viscosity, the maximum melt strength (force) of the polymer blend prepared using the mixed CGC system is about 10 cN versus about 7 cN for the polymer prepared using primary catalyst 1. This figure demonstrates that the polymer blend produced using a mixed CGC system has higher melt strength as compared to a polymer of similar Mooney viscosity made with only one component of the system. Such polymer blends exhibit better processing properties for applications requiring higher melt (or green) strength, e.g., calendering, blow molding and thermoforming.

Moreover, the polymer blend components have a substantially uniform molecular architecture as evidenced by the single DSC melting and cooling points (the melting peak tends to be broader at the lower densities). Again, this is consistent with the similarity in reactivity ratios of catalysts A and B with respect to ethylene and 1-octene as reported in Table 7A.

Crosslinking Data

Primary catalyst 1 for all samples was (t-butylamido) dimethyl(2-methyl-s-indacen-1-yl)silanetitanium 1,3-pentadiene. Primary catalyst 2 for all samples was (t-butylamido)dimethyl(tetramethylcyclopentadienyl) silanetitanium 1,3-pentadiene.

The crosslinked elastomers identified in Table 3 below were prepared by melt blending the polymer blend of Run 22 (reported in Table 2) at 90 C. in a Haake rheometer equipped with a 310 cc mixing bowl and Banbury style rotors. The peroxide was added to the polymer melt and mixed at 40 rpm for 2–3 minutes. The blended compositions were removed from the Haake bowl and used to produce compression-molded plaques. The plaques were compression molded and crosslinked at 177 C. for T90 plus 2 minutes to ensure full cure. Plaques were removed and immersed in a water bath until cool per ASTM D-3182. ASTM test samples were then cut from the plaques for testing.

The results are also reported in Table 3 and as is evident from these results, the plaques made with the mixed catalyst system exhibit comparable to better physical properties than the plaques made from one of the catalyst components alone. Enhanced properties include those of tear strength, tensile (break and yield) and trouser tear.

TABLE 3

Physical Properties of Crosslinked Ethylene/1-Octene 30 Mooney Elastomers

| Sample Number | 23 | 24 | 25 | 26 | 27 | 28 | 29 | 30 | 31 |
|---|---|---|---|---|---|---|---|---|---|
| | Primary Catalyst 2* | | | Primary Catalyst 1* | | | Dual Catalyst* | | |
| DICUP ® ADDITION (pph) | 1.5 | 2.5 | 3.5 | 1.5 | 2.5 | 3.5 | 1.5 | 2.5 | 3.5 |
| POLYMER weigh-up | 200 | 200 | 200 | 200 | 200 | 200 | 200 | 200 | 200 |
| PEROXIDE weigh-up | 3 | 5 | 7 | 3 | 5 | 7 | 3 | 5 | 7 |
| Shore A Hardness ASTM D-2240 | | | | | | | | | |
| 1 second | 67.6 | 67.5 | 66.8 | 68.8 | 68.4 | 67.7 | 72.6 | 70.8 | 71.4 |
| 10 second | 65.2 | 65.0 | 64.3 | 66.3 | 65.9 | 65.4 | 70.3 | 68.6 | 69.1 |
| Density ASTM D-792 | | | | | | | | | |
| at 23° | 0.870 | 0.871 | 0.871 | 0.871 | 0.870 | 0.871 | 0.871 | 0.872 | 0.873 |
| Tensile @ 20 in./min ASTM D-638 | | | | | | | | | |
| Tensile @ Break (psi) | 872 | 597 | 502 | 953 | 650 | 543 | 993 | 759 | 566 |
| Ult. Elongation(%) | 582 | 444 | 357 | 624 | 460 | 378 | 588 | 447 | 332 |
| Tensile @ Yield(psi) | 172 | 158 | 162 | 190 | 158 | 140 | 224 | 185 | 192 |
| Elong @ Yield(%) | 29 | 27 | 28 | 31 | 24 | 20 | 34 | 26 | 28 |
| Young's Modulus(psi) | 872 | 940 | 939 | 799 | 962 | 1014 | 910 | 1097 | 1191 |
| Toughness (lbs-in.) | 83 | 54 | 39 | 99 | 60 | 45 | 96 | 67 | 45 |
| 100% Modulus(psi) | 289 | 286 | 291 | 305 | 306 | 310 | 336 | 340 | 341 |
| Type C Tear ASTM D-624 | | | | | | | | | |
| Tear Strength(pli) | 187.90 | 163.60 | 134.00 | 184.30 | 177.90 | 147.60 | 214.50 | 194.70 | 177.30 |
| Total Energy(in.-lbs) | 57.72 | 37.12 | 21.52 | 53.94 | 45.12 | 22.43 | 64.92 | 42.75 | 29.13 |
| Trouser Tear ASTM D-624 | | | | | | | | | |
| Tear Strength(pli) | 22.40 | 18.30 | 12.40 | 28.90 | 14.20 | 11.60 | 35.20 | 22.00 | 14.70 |
| Total Energy(in.-lbs) | 11.37 | 9.11 | 3.95 | 13.60 | 5.37 | 4.37 | 19.48 | 8.33 | 3.91 |
| ODR @ 177 C ASTM D-2084 | | | | | | | | | |
| Min Torque | 9.40 | 10.22 | 10.34 | 8.96 | 9.70 | 10.96 | 11.47 | 10.64 | 11.36 |
| Max Torque | 60.03 | 68.20 | 79.12 | 57.83 | 71.71 | 79.24 | 72.08 | 73.85 | 82.09 |
| Delta | 50.63 | 57.98 | 68.78 | 48.87 | 62.01 | 68.28 | 60.61 | 63.21 | 70.73 |
| T2 | 0.49 | 0.57 | 0.43 | 1.04 | 1.01 | 0.52 | 1.04 | 0.48 | 0.57 |
| T90 | 5.09 | 5.09 | 4.35 | 5.35 | 5.08 | 4.44 | 4.56 | 4.35 | 4.33 |

Thermoplastic Olefin (TPO) Applications

The polymer blends identified in Table 4 were mixed in the reported ratios, and then tumble blended in a 5-gallon bucket to assure good dispersion of all ingredients. The polymer blends were then melt blended in a ZSK 30 millimeter Werner Pfleiderer, corotating, twin-screw extruder equipped with a screw configuration that had basic kneading blocks followed by gear mixer flights to produce a medium shear, high mixing configuration. The extruder operated at a melt temperature of approximately 240 C. and a speed of 200 rpm. The melt blends were passed through a 100 F. water bath, chopped into granules, and collected for injection molding.

TABLE 4

TPO Formulations of Elastomers Made With a Mixed Catalyst System

| Sample Number | 32 | 33 | 34 | 35 | 36 | 37 |
|---|---|---|---|---|---|---|
| Accpro 9934*[1] (35 melt index) | 70 | 70 | — | — | — | — |
| Profax 6323*[2] | — | — | 70 | 63 | 70 | 63 |
| Run 22 Polymer Blend (33 Mooney) | 30 | — | 30 | 27 | — | — |
| Run 20 Polymer Blend (52 Mooney) | — | 30 | — | — | 30 | 27 |
| AG 101 talc*[3] | — | — | — | 10 | — | 10 |
| Irganox 1076*[4] | 0.2 | 0.2 | 0.2 | 0.2 | 0.2 | 0.2 |

*[1]Propylene homopolymer having a density of 0.90 g/cc and $I_2$ of 35 g/10 min at 230 C., available from Amoco.
*[2]Propylene homopolymer having a density of 0.90 g/cc and $I_2$ of 12 g/10 min at 230 C., available from Montel.
*[3]Available from Microtuff Specialty Minerals
*[4]Phenolic antioxidant available from Ciba Specialty Chemicals.

ASTM samples were prepared by injection molding on a Arburg Model 370C-800-225 (800 kilonewton (kN) hydraulic clamping force) reciprocating screw injection molding machine. Molding temperatures for the barrel were set at 250 F. (feed), 385, 430, 440 and 430 F. (barrel through nozzle) while the mold temperature was 88 F. Injection cycles were approximately 1.75 seconds injection, 30 seconds holding and 20 seconds cooling. The hold pressures were approximately 600 bars and the velocities and pressures were adjusted as needed to completely fill mold cavities.

ASTM standard procedures were used to evaluate the molded samples. In addition, notched Izod values were obtained using an Izod impact tester and a low speed notcher equipped with a 10 mil (0.25 mm) wheel in accordance with ASTM D-256. Unnotched weldline Izod samples were cut from the middle of a double gated tensile bar and tested on the Izod impact tester Test results are reported in Table 5. The Izod impact values were measured in units of foot-pounds per square inch (fpsi). Tensile strengths were measured in units of pounds per square inch (psi).

TABLE 5

Physical Properties of TPO Formulations of Elastomers Made With a Mixed Catalyst System

| Sample Number | 32 | 33 | 34 | 35 | 36 | 37 |
|---|---|---|---|---|---|---|
| Shore D Hardness ASTM D-2240 | | | | | | |
| 1 second | 66.9 | 66.3 | 61.6 | 64.5 | 63.8 | 65.4 |
| 10 second | 64.3 | 63.7 | 58.1 | 61.2 | 60.8 | 62.3 |
| Tensile @ w in./min ASTM D-6382 | | | | | | |
| Tensile @ Break(psi) | 2878 | 2542 | 2790 | 2583 | 3259 | 2665 |
| Ult. Elongation(%) | 25 | 65 | 577 | 351 | 534 | 194 |
| Tensile @ Yield (psi) | 3267 | 2972 | 2718 | 2495 | 2861 | 3242 |
| Elong @ Yield(%) | 4 | 5 | 14 | 7 | 8 | 6 |
| Rheometry (dg/10 min) ASTM D-1238 | | | | | | |
| $I_2$ @ 230 C/2.16 kg | 14.4 | 10.7 | 5.9 | 5.6 | 5.7 | 4.5 |
| Weld Line @ 2 in./min ASTM D-638 | | | | | | |
| Tensile @ Break(psi) | 2139 | 2568 | 1984 | 1915 | 2370 | 2088 |
| Ult. Elongation (%) | 1 | 3 | 3 | 1 | 8 | 3 |
| Tensile @ Yield(psi) | 2131 | 2562 | 1982 | 1912 | 2406 | 2079 |
| Elong @ Yield (psi) | 1 | 3 | 3 | 1 | 6 | 2 |
| 3-Point Flex ASTM D-790 | | | | | | |
| Flex Modulus(psi) | 168900 | 155576 | 102315 | 170010 | 112305 | 172583 |
| 2% Secant Modulus(psi) | 154042 | 142289 | 93316 | 137421 | 103310 | 141590 |
| Gloss ASTM D-523 | | | | | | |
| 20° | 35.1 | 16.8 | 67.8 | 45.9 | 27.5 | 36.3 |
| 60° | 51.2 | 30.9 | 82.3 | 68.9 | 66.6 | 67.6 |
| 85° | 84.3 | 79.1 | 98.8 | 95.3 | 92.1 | 91.5 |
| Dynacup Total Energy (ft lb) | | | | | | |
| 23 C | 27.9 | 27.7 | 26 | 27.2 | 31 | 32.3 |
| −30 C | 26.6 | 25.9 | 39.4 | 24.5 | 36.1 | 17.0 |
| Izod Impact Strength (ft lbs/in.) | | | | | | |
| 23 C | 1.54 | 1.64 | 14.39 | 12.03 | 13.89 | 12.3 |
| 0 C | 1.48 | 1.16 | 9.93 | 5.34 | 1.85 | 2.25 |
| RT Weldline Izods (ft lbs/in.) | | | | | | |
| 23 C | 1.74 | 3.95 | 5.85 | 2.56 | 7.66 | 2.49 |
| Heat Distortion @ 66 psi | | | | | | |
| HDT in C | 99.5 | 91.7 | 80.3 | 78.9 | 77.5 | 81.2 |

The data reported in Table 5 shows a unique balance of rheometry, modulus, impact strength, and weld line strength important for TPO automotive applications.

Blend of TPO and a Medium Mooney Viscosity Ethylene/1-Octene Polymer Blend

Medium Mooney viscosity, e.g., 35–55, polymer blends of ethylene and 1-octene (i.e., an ethylene/1-octene copolymer made with a mixed CGC system and of substantially uniform molecular architecture) yield a superior combination of tensile strength, toughness, scuff or abrasion resistance, color stability and thermoformability than that obtainable either with a medium Mooney viscosity EPDM or a low Mooney viscosity, e.g., less than 35, conventional ethylene/1-octene copolymer (i.e., a nonblended copolymer) when blended with a TPO. Such TPO blends are useful in many thermoforming operations, e.g., the manufacture of automotive instrument panel skins.

The following TPO blends were mixed in a Haake 230 cm$^3$ mixing bowl fitted with roller blades:

TABLE 6A

| | TPO Blends | | |
|---|---|---|---|
| Blend | 38 | 38-C1 | 38-C2 |
| Profax 6323 | 25 | 25 | 25 |
| Surlyn 9520 | 27 | 27 | 27 |
| Elvaloy AS | 3 | 3 | 3 |
| Nordel 3681 | 0 | 45 | 0 |
| ENGAGE 8150 | 0 | 0 | 45 |
| EO Polymer Blend | 45 | 0 | 0 |

Profax 6323, available from Montel, is a propylene homopolymer having a density of 0.90 g/cc and a melt flow index of 12 grams/10 min. at 230° C. Surlyn 9520, available from DuPont, is an ethylene/methacrylic acid copolymer partially neutralized with zinc, having a melt index of 1.1 and a specific gravity of 0.95 g/cc. Elvaloy AS, also supplied by DuPont, is an ethylene/n-butyl acrylate/glycidyl methacrylate copolymer with a melt index of 12 g/10 min and a specific gravity of 0.94 g/cc. Nordel 3681, produced by DuPont Dow Elastomers, L.L.C., is an ethylene/propylene/diene terpolymer using 1,4 hexadiene as the diene termonomer, having 71 wt. % ethylene with a nominal 52 ML(1+4) Mooney viscosity and was polymerized via a vanadium based catalyst. ENGAGE 8150 is an ethylene/1-octene copolymer with a density of 0.868 g/cc, a nominal melt index of 0.5 g/10 min at 190° C., and a nominal Mooney viscosity of 45 ML (1+4). It was polymerized with t-butylamido) dimethyl (tetramethylcyclopentadienyl) silanetitanium 1,3-pentadiene. EO polymer blend is an ethylene/i-octene copolymer with a density of 0.868 g/cc and a nominal Mooney viscosity of 45 ML (1+4), and it was polymerized via a 50/50 wt./wt. ratio of t-butylamido) dimethyl(tetramethylcyclopentadienyl)silanetitanium 1,3-pentadiene and t-butylamido)dimethyl(2-methyl-s-undacen-1-yl)silanetitanium 1,3-pentadiene. Melt index is measured in accordance with ASTM D1238. Mooney viscosity is measured in accordance with ASTM D1646.

The following mix procedure was used:

1) Set Haake bowl to 190 C., split signal from melt thermocouple to control Thermocouple for bowl.

2) Start initially at 30 rpm, add all polymers, except for Elvaloy AS, to bowl.

3) Increase speed to 75 rpm

4) Mix for five minutes, then add Elvaloy AS and mix for four minutes.

5) Remove melt from bowl and press out into crude plaques using a 32 mm thick Mold at 190 C. for three minutes at 18,200 Kg pressure, then cool for three Minutes at 18,200 Kg pressure.

The samples were then compression molded into 15.2 cm×25.5 cm×1.5 mm thick plaques using the following compression cycle:

1) 3 minutes preheat at 210 C., no pressure.

2) 3 minutes at 18,200 Kg, 210 C.

3) 3 minutes at 18,200 Kg, cooling.

Sample hardness was tested according to ASTM D 2240. Tensile properties were tested according to ASTM D 638. Tear properties were tested in accordance with ASTM D 624. Abrasion resistance was measured according to ASTM D 1630.

Elevated temperature stress-strain measurements give an indication of how the compound with thermoform at elevated temperature. During sheet thermoforming, the compound must exhibit optimum stress-strain behavior. A very stiff product will not yield under vacuum. On the other hand, the sheet at the forming temperature must exhibit enough stress response to minimize thin spots during the forming operation. Tensile properties at 140 C. were measured by cutting tensile samples from an ISO T2 die. These samples were placed in a tensile tester fitted with an environmental chamber heated to 140 C. The tensile samples were strained at a rate of 50 cm/min. Strain was measured via an optical extensiometer.

TABLE 6B

TPV Blend Properties

| Property | 38 | 38-C1 | 38-C2 |
|---|---|---|---|
| Shore D Hardness 1 second | 42.8 | 45.0 | 38.3 |
| Tensile @ 7.9 cm/min Tensile @ Break (Mpa) | 12.9 | 8.9 | 12.2 |
| Ult. Elongation (%) | 435 | 262 | 486 |
| Type C Tear Tear Strength (PLI) | 398 | 295 | 374 |
| NBS Abrasion Index | 71 | 58 | 49 |
| Hot Stress-strain @ 140 C. Max Eng. Stress, Mpa | 0.306 | 0.354 | 0.235 |
| True Stress @ 500% elong., Mpa | 1.78 | 1.88 | 1.38 |

As can be seen from the results reported in Table 6B, Comparative Example 38-C1, which contains Nordel 3681, contains lower ultimate tensile and elongation than either Comparative Example 38-C2 or Example 38, both containing ethylene/1-octene copolymers. However, Comparative Example 38-C1 exhibits acceptable stress-strain characteristics at 140 C. Note that Example 38 exhibits tensile stress at 140 C. much closer to Comparative Example 38-C1 than does Comparative Example 38-C2. Example 38 is much more suitable for vacuum thermoforming than Comparative Example 38-C2. Further, note that Example 38 exhibits significantly higher abrasion resistance than either of the two comparative examples. Thus, Example 38 exhibits a unique combination of high ultimate tensile strength, elongation, abrasion resistance and high elevated temperature tensile stress, making it especially suitable for automotive interior.

Tape Extrusion Comparison

A 30 Mooney polymer produced with catalyst A ((t-butylamido)dimethyl-(tetramethylcyclopentadienyl) silanetitanium 1,3-pentadiene) was compared to a 30 Mooney polymer produced with a mixed catalyst A+catalyst B ((t-butylamido)dimethyl(2-methyl-s-indacen-1-yl) silanetitanium 1,3-pentadiene) in a extruded tape test. Both polymers were extruded on a 2½ inch 30/1 L/D Killion extruder having a barrier ET screw. Dimensions of the tape die were 1.5 inches wide and 0.06 inches thick. The extruder temperature profile was: feed 100 C., 176 C., 204 C., 204 C., 204 C., and 204° C. at the die. The extruder was run at 35 rpm and 35 pounds per hour. Results from this test indicated sever melt fracture on the tape made with the polymer produced by catalyst A while the tape made from the polymer produced by the mixed catalyst system of A and B showed no evidence of melt fracture.

Reactivity Ratios

Reactivity ratios for propylene, butene, 1-octene and ENB are reported in Tables 7A–C. These ratios are based on the data reported for runs 1, 3, 4, 6–8, 10, 14–15 and 19. All the values assumed r2 was equal to 0.5.

TABLE 7A

Ethylene/Octene Copolymer

| Run Number | Catalyst Code | Reactor Temp C. | Polymer Composition | | r1 value |
|---|---|---|---|---|---|
| | | | $C_2$ wt % | $C_8$ Wt % | |
| 1 | A | 90 | 64.59 | 35.41 | 3.5 |
| 3 | B | 90 | 65.17 | 34.83 | 3.6 |
| 4 | A | 110 | 64.91 | 35.09 | 5.1 |

TABLE 7A-continued

Ethylene/Octene Copolymer

| Run Number | Catalyst Code | Reactor Temp C. | Polymer Composition | | |
|---|---|---|---|---|---|
| | | | $C_2$ wt % | $C_8$ Wt % | r1 value |
| 6 | B | 110 | 58.40 | 41.60 | 3.8 |
| 7 | B | 110 | 45.50 | 54.50 | 3.3 |
| 8 | C | 110 | 76.00 | 24.00 | 14.3 |

*A - (t-butylamido)dimethyl(tetramethylcyclopentadienyl)silanetitanium 1,3-pentadiene.
B - (t-butylamido)dimethyl(2-methyl-s-indacen-1-yl)silanetitanium 1,3-pentadiene.
C - [N-(1,1-dimethylethyl)-1,1-dimethyl-1-((1,2,3,3a,7a-h)-3-(1-pyrrolidinyl)-1H-inden-1-yl)silanaminato-(2-)-N][(2,3,4,5,-h)-2,4-pentadiene)]-titanium.

As reported in Table 7A, the reactivity ratios for catalysts A and B are essentially the same, i.e., within 5%, for ethylene/1-octene polymerization at 90 C. At the higher temperature of 110 C., the reactivity ratios are still similar, e.g., within 35%. The reactivity ratios for catalysts B and C at 110 C. are, in contrast, very different with the reactivity ratio for catalyst C 4.33 times greater than that of catalyst B. The large difference in reactivity ratio is evident in the fact that polymerization with catalyst C yielded a polymer with less than half the amount of 1-octene incorporated into it as was incorporated into it with catalyst B.

TABLE 7B

EPDM Terpolymers Composition

| Run Number | Catalyst Code | $C_2$ wt % | $C_3$ Wt % | ENB Wt % | r1 value for $C_3$ | r1 value for ENB |
|---|---|---|---|---|---|---|
| 14 | A | 66 | 30.2 | 3.9 | 2.8 | 5.5 |
| 10 | B | 67.1 | 26.2 | 6.7 | 3.5 | 3.6 |

As reported in Table 7B, the reactivity ratios for ethylene/propylene polymerization at 100 C. are similar for catalysts A and B, i.e., within 25% of each other. The reactivity ratios for ethylene/ENB, in contrast, are further apart, i.e., 52%.

TABLE 7C

EBDM Terpolymers Composition

| Run Number | Catalyst Code | $C_2$ wt % | $C_4$ Wt % | ENB Wt % | r1 value for $C_4$ | r1 value for ENB |
|---|---|---|---|---|---|---|
| 19 | A | 79.31 | 18.18 | 2.52 | 7.3 | 8.7 |
| 15 | B | 75.68 | 19.16 | 5.16 | 6.4 | 4.2 |

As reported in Table7C, the reactivity ratios for ethylene/butene polymerization at 100 C. with catalysts A and B are very similar, with 14% of one another. In contrast, the reactivity ratios for ethylene/ENB at 100 C. with catalysts A and B are very different, with the reactivity ratio of catalyst A more than twice that of catalyst B.

For comparative purposes, Kaminsky and Schlobohm report in *Makromol. Chem. Makromol. Symp.*, 4, 103–18, 1986, that the reactivity ratio r1 of bis(cyclopentadienyl) zirconium dichloride (a sandwich type zirconium compound) for ethylene polymerization with butene at 85 C. is 125, more than 17 times that of catalyst A at 100 C.

Although the invention has been described in considerable detail through the specification and examples, one skilled in the art can make many variations and modifications without departing from the spirit and scope of the invention as described in the following claims.

What is claimed is:

1. A process for preparing an ethylene-based polymer blend having (a) a molecular weight distribution (i) of at least about 2, and (ii) at least about ten percent greater than that of a polymer prepared in a single reactor with either the first or second catalyst alone under similar polymerization conditions, and (b) a uniform molecular architecture, the process comprising contacting under polymerization conditions and in a single reaction vessel:

A. ethylene
B. at least one $C_3$–$C_{20}$ α-olefin, and
C. a mixed catalyst system comprising a first catalyst and a second catalyst, and each catalyst comprising:
1. a metal complex of formula I $$ZLMX_pX'_q \qquad (I)$$

wherein
M is a metal of Group 4 of the Periodic Table of the Elements having an oxidation state of +2, +3 or +4 bound in an 5 bonding mode to L;
L is a cyclopentadienyl-, indenyl-, tetrahydroindenyl-, fluorenyl-, tetrahydrofluorenyl-, or octahydrofluorenyl-group covalently substituted with at least the divalent moiety, Z, and L further may be substituted with from 1 to 8 substituents independently selected from the group consisting of hydrocarbyl, halo, halohydrocarbyl, hydrocarbyloxy, dihydrocarbylamine, dihydrocarbylphosphino or silyl groups containing up to 20 nonhydrogen atoms;
Z is a divalent moiety, or a moiety comprising one σ-bond and a neutral two electron pair able to form a coordinate-covalent bond to M, Z comprising boron, or a member of Group 14 of the Periodic Table of the Elements, and also comprising nitrogen, phosphorus, sulfur or oxygen;
X is a anionic ligand group having up to 60 atoms exclusive of the class of ligands that are cyclic, delocalized, π-bound ligand groups;
X' independently each occurrence is a neutral ligating compound having up to 20 atoms;
p is 0, 1 or 2, and is two less than the formal oxidation state of M, with the proviso that when X is a dianionic ligand group, p is 1; and
q is 0, 1 or 2; and
2. an activating cocatalyst;
with the provisos that
D. the first catalyst is different from the second catalyst, and
E. the weight ratio of the first catalyst to the second catalyst, based on the weight of the metal M in each catalyst, is between about 90:10 and 10:90.

2. A process for preparing an ethylene-based polymer blend having an MWD (a) of at least about 2, and (b) at least ten percent greater than any ethylene-based polymer component of the blend prepared in a single reactor with any single component of the mixed catalyst system under similar polymerization conditions is prepared by contacting under polymerization conditions and in a single reaction vessel:

A. ethylene,
B. at least one $C_3$–$C_{20}$ α-olefin,
C. at least one polyene, and D. a mixed CGC system comprising a first catalyst and a second catalyst, each catalyst having substantially the same reactivity ratio with respect to at least one $C_3$–$C_{20}$ α-olefin of B, and each catalyst comprising:

1. A metal complex of formula I, $$ZLMX_pX'_q \qquad (I)$$

wherein

M is a metal of Group 4 of the Periodic Table of the Elements having an oxidation state of +2, +3 or +4 bound in an 5 bonding mode to L;

L is a cyclopentadienyl-, indenyl-, tetrahydroindenyl-, fluorenyl-, tetrahydrofluorenyl-, or octahydrofluorenyl-group covalently substituted with at least the divalent moiety, Z, and L further may be substituted with from 1 to 8 substituents independently selected from the group consisting of hydrocarbyl, halo, halohydrocarbyl, hydrocarbyloxy, dihydrocarbylamine, dihydrocarbylphosphino or silyl groups containing up to 20 nonhydrogen atoms;

Z is a divalent moiety, or a moiety comprising one σ-bond and a neutral two electron pair able to form a coordinate-covalent bond to M, Z comprising boron, or a member of Group 14 of the Periodic Table of the Elements, and also comprising nitrogen, phosphorus, sulfur or oxygen;

X is a anionic ligand group having up to 60 atoms exclusive of the class of ligands that are cyclic, delocalized, π-bound ligand groups;

X' independently each occurrence is a neutral ligating compound having up to 20 atoms;

p is 0, 1 or 2, and is two less than the formal oxidation state of M, with the proviso that when X is a dianionic ligand group, p is 1; and q is 0, 1 or 2; and 2. an activating cocatalyst;

with the provisos that

E. the first catalyst is different from the second catalyst, and

F. the weight ratio of the first catalyst to the second catalyst, based on the weight of the metal M in each catalyst, is between about 90:10 and 10:90.

3. The process of claim 1 or 2 in which each catalyst comprises a metal complex of the formula:

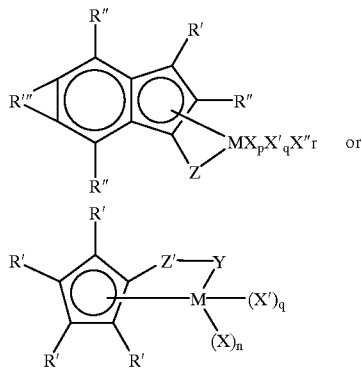 or 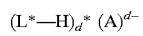

in which M is titanium, zirconium or hafnium in the +2, +3 or +4 formal oxidation state;

R' and R" are independently each occurrence hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbyl-sulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylene-phosphino-substituted hydrocarbyl, or hydrocarbylsulfido-substituted hydrocarbyl, said R' or R" group having up to 40 nonhydrogen atoms, and optionally two or more of the foregoing groups may together form a divalent derivative;

R'" is a divalent hydrocarbylene- or substituted hydrocarbylene group forming a fused system with the remainder of the metal complex, said R'" containing from 1 to 30 nonhydrogen atoms;

X is a monovalent anionic ligand group having up to 60 atoms exclusive of the class of ligands that are cyclic, delocalized, π-bound ligand groups;

X' independently each occurrence is a neutral ligating compound having up to 20 atoms;

X" is a divalent anionic ligand group having up to 60 atoms;

Y is a divalent ligand group comprising nitrogen, phosphorus, oxygen or sulfur and having up to 20 nonhydrogen atoms, Y is also bonded to Z and M through the nitrogen, phosphorus, oxygen or sulfur, and optionally Y and Z together form a fused ring system;

Z is a divalent moiety, or a moiety comprising one σ-bond and a neutral two electron pair able to form a coordinate-covalent bond to M, said Z comprising boron or a member of Group 14 of the Periodic Table of the Elements, and also comprising nitrogen, phosphorus, sulfur or oxygen;

Z' is $SiR^*_2$, $CR^*_2$, $SiR^*_2SiR^*_2$, $CR^*_2CR^*_2$, $CR^*=CR^*$, or $CR^*_2SiR^*_2$;

R* each occurrence is independently selected from the group consisting of hydrogen, alkyl, aryl, silyl, halogenated alkyl, halogenated aryl groups having up to 20 nonhydrogen atoms, and mixtures thereof, or two or more R* groups from Y, Z', or from Z' together with Y form a fused ring system;

n is 0, 1 or 2;

p is 0, 1, 2, or 3;

q is 0, 1 or 2, q' is 0 or 1; and r is 0 or 1.

4. The process of claim 1 or 2 in which the activating cocatalyst is at least one of the formula:

$$(L^*—H)_d^* (A)^{d-}$$

in which

L* is a neutral Lewis base;

$(L^*—H)^+$ is a Bronsted acid;

$A^{d-}$ is a noncoordinating, compatible anion having a charge of d–; and d is an integer of 1–3.

5. The process of claim 1 or 2 in which the activating cocatalyst is at least one of trispentafluorophenyl-borane and at least one of a modified methylalumoxane.

6. The process of claim 4 in which the activating cocatalyst of the first catalyst is the same as the activating cocatalyst of the second catalyst.

7. The process of claim 4 in which the activating cocatalyst of the first catalyst is different than the activating cocatalyst of the second catalyst.

8. The process of claim 4 in which the α-olefin is at least one $C_3$–$C_8$ α-olefin.

9. The process of claim 2 in which the polyene is at least one of 1,3-butadiene, isoprene, 1,3-pentadiene, 7-methyl-1,6-octadiene and 5-ethylidene-2-norbornene.

10. The process of claim 9 in which the polymerization conditions include liquid or suspension phase conditions and a temperature between about 65 and 160 C.

11. The process of claim 10 in which the first catalyst is (t-butylamido)dimethyl(2-methyl-s-indacen-1-yl) silanetitanium 1,3-pentadiene and the second catalyst is (t-butylamido)dimethyl(tetramethylcyclopentadienyl) silanetitanium 1,3-pentadiene.

12. The process of claim 1 or 2 in which three ethylene-based polymer blend has rheology ratio greater than that of a polymer blend component of substantially the same Mooney viscosity and prepared in a single reactor with either the first or second catalyst alone under similar polymerization conditions.

13. The process of claim 12 in which the ethylene-based polymer blend has an $I_2$ of less than about 0.5.

14. The process of claim 12 in which the ethylene-based polymer blend has a Mooney viscosity of greater than about 35.

15. The process of claim 4 in which the activating cocatalyst comprises N,N-di(n-hexadecanyl)-N-methylammonium tetrakis(2,3,4,5,6-pentafluorophenyl) borate.

16. The process of claim 4 in which the activating cocatalyst comprises a combination of (i) N,N-di(n-hexadecanyl)-N-methylammonium tetrakis(2,3,4,5,6-pentrafluorophenyl)borate, (ii) tris(pentafluorophenyl) borane, and (iii) a modified methylalumoxane.

17. The process of claim 1 or 2 in which the single reaction vessel is one of a multiplicity of reaction vessels connected in series.

18. The process of claim 17 in which the single reaction vessel is one of a multiplicity of reaction vessels connected in parallel.

* * * * *

UNITED STATES PATENT AND TRADEMARK OFFICE
CERTIFICATE OF CORRECTION

PATENT NO. : 6,369,176 B1
DATED : April 9, 2002
INVENTOR(S) : Michael K. Laughner et al.

It is certified that error appears in the above-identified patent and that said Letters Patent is hereby corrected as shown below:

Title page,
Item [57], ABSTRACT,
Second to last line, replace "(α-olefin," with -- α-olefin, --.

Column 3,
Line 30, replace "(α-olefin," with -- α-olefin --.

Column 4,
Line 22, replace "$\pi^5$" with -- $\eta^5$ --.

Column 5,
Line 20, replace "x-olefin" with -- α-olefin --.

Column 22,
Lines 51-54, replace $$M_2 \bullet + M_1 \xrightarrow{k_{11}} M_1 \qquad (4)$$
$$r_1 = k_{11} / k_{12}$$
$$r_2 = k_{22} / k_{21}$$

with $$M_2 \bullet + M_1 \xrightarrow{k_{11}} M_1 \qquad (4)$$
$$r_1 = k_{11} / k_{12} \qquad (5)$$
$$r_2 = k_{22} / k_{21} \qquad (6)$$

Column 23,
Line 33, replace "(α-olefin" with -- α-olefin --.

Column 32,
Line 38, replace "a-olefin" with -- α-olefin --.

Column 39,
Line 17, replace "i-octene" with -- 1-octene --.

Column 42,
Line 23, replace "5" with -- $\eta^5$ --.

UNITED STATES PATENT AND TRADEMARK OFFICE
CERTIFICATE OF CORRECTION

PATENT NO. : 6,369,176 B1
DATED : April 9, 2002
INVENTOR(S) : Michael K. Laughner et al.

It is certified that error appears in the above-identified patent and that said Letters Patent is hereby corrected as shown below:

Column 43,
Line 11, replace "5" with -- $\eta^5$ --.

Column 45,
Line 20, replace "three" with -- the --.

Signed and Sealed this

Eighteenth Day of June, 2002

*Attest:*

JAMES E. ROGAN
*Attesting Officer*         *Director of the United States Patent and Trademark Office*